(12) United States Patent
Jung et al.

(10) Patent No.: US 9,900,889 B2
(45) Date of Patent: Feb. 20, 2018

(54) TERMINAL AND METHOD FOR ALLOCATING RESOURCE

(71) Applicant: Electronics and Telecommunications Research Institute, Daejeon (KR)

(72) Inventors: Hoi Yoon Jung, Daejeon (KR); Jung Sun Um, Daejeon (KR); Byung Jang Jeong, Daejeon (KR); Hyung Do Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 14/976,276

(22) Filed: Dec. 21, 2015

(65) Prior Publication Data
US 2016/0183254 A1    Jun. 23, 2016

(30) Foreign Application Priority Data

Dec. 23, 2014   (KR) .................... 10-2014-0186676

(51) Int. Cl.
| | |
|---|---|
| *H04L 5/00* | (2006.01) |
| *H04W 72/04* | (2009.01) |
| *H04L 1/18* | (2006.01) |
| *H04W 72/02* | (2009.01) |
| *H04L 29/08* | (2006.01) |
| *H04W 4/00* | (2018.01) |

(52) U.S. Cl.
CPC ....... *H04W 72/0446* (2013.01); *H04L 1/1812* (2013.01); *H04L 5/0055* (2013.01); *H04L 29/08306* (2013.01); *H04W 72/02* (2013.01); *H04W 4/005* (2013.01)

(58) Field of Classification Search
CPC ..... H04L 1/18–1/1896; H04L 5/0053–5/0055; H04L 29/08306; H04W 72/0446; H04W 72/02; H04W 4/005
USPC .......... 370/278, 280, 294, 329; 714/748–749
See application file for complete search history.

(56) References Cited

U.S. PATENT DOCUMENTS

| | | | |
|---|---|---|---|
| 2011/0041027 A1* | 2/2011 | Fong ..................... | H04L 1/1812 714/749 |
| 2011/0255450 A1* | 10/2011 | Wang ................ | H04W 72/0493 370/280 |
| 2011/0282989 A1* | 11/2011 | Geirhofer ............. | H04W 28/18 709/224 |
| 2011/0305179 A1* | 12/2011 | Wang .................... | H04L 1/0031 370/311 |
| 2013/0201884 A1* | 8/2013 | Freda .................. | H04W 72/005 370/278 |
| 2013/0258996 A1 | 10/2013 | Jung et al. | |
| 2013/0343239 A1* | 12/2013 | Damnjanovic ......... | H04L 5/001 370/280 |

(Continued)

FOREIGN PATENT DOCUMENTS

| | | | | |
|---|---|---|---|---|
| WO | 2013162261 A1 | 10/2013 | | |
| WO | WO 2014/185836 | * 11/2014 | ............... | H04L 1/18 |

*Primary Examiner* — Edan Orgad
*Assistant Examiner* — Ivan O Latorre
(74) *Attorney, Agent, or Firm* — William Park & Associates Ltd.

(57) ABSTRACT

Disclosed is a method for allocating a resource of a terminal. The method includes: receiving downlink data from a base station; and allocating a resource for a device-to-device communication to a sub-frame by considering a hybrid ARQ (HARQ) transmission delay with respect to the received downlink data.

7 Claims, 41 Drawing Sheets

(56) References Cited

U.S. PATENT DOCUMENTS

| | | | | |
|---|---|---|---|---|
| 2014/0003400 | A1* | 1/2014 | Lim | H04L 1/1861 370/336 |
| 2014/0004867 | A1 | 1/2014 | Noh et al. | |
| 2014/0086175 | A1* | 3/2014 | Hakola | H04W 72/1242 370/329 |
| 2014/0269338 | A1* | 9/2014 | Jung | H04L 5/0055 370/241 |
| 2015/0009932 | A1* | 1/2015 | Choi | H04L 1/16 370/329 |
| 2015/0085719 | A1* | 3/2015 | Yin | H04L 1/1896 370/280 |
| 2015/0085782 | A1* | 3/2015 | Seo | H04L 1/1861 370/329 |
| 2015/0173098 | A1* | 6/2015 | Agiwal | H04W 72/12 370/329 |
| 2015/0244485 | A1* | 8/2015 | Nguyen | H04W 72/0446 370/280 |
| 2016/0013896 | A1* | 1/2016 | Sun | H04L 1/1854 370/280 |
| 2016/0037512 | A1* | 2/2016 | Lei | H04W 56/003 370/336 |
| 2016/0080133 | A1* | 3/2016 | Golitschek Edler von Elbwart | H04W 72/0446 370/280 |
| 2016/0095133 | A1* | 3/2016 | Hwang | H04L 1/00 370/329 |
| 2016/0345274 | A1* | 11/2016 | Zhao | H04W 72/082 |
| 2016/0353499 | A1* | 12/2016 | Takano | H04W 72/042 |
| 2017/0196030 | A1* | 7/2017 | Ma | H04W 76/02 |

* cited by examiner

FIG.2

| FRAME | SUB-FRAME INDEX | | | | | | | | | |
|---|---|---|---|---|---|---|---|---|---|---|
| CONFIGURATION | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG.3

| SUB-FRAME INDEX |||||||||||
|---|---|---|---|---|---|---|---|---|---|
| 0 | 1 | 2 | 3 | 4 | 5 | 6 | 7 | 8 | 9 |
| D | S | U | U | U | D | S | U | U | U |

Data Tx　　　　　Ack/Nack
[n]　　　　　　　[n+4]

FIG. 4

| FRAME CONFIGURATION | \multicolumn{10}{c}{SUB-FRAME INDEX (n)} | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | – | – | – | 6 | – | 4 |
| 1 | – | – | 7,6 | 4 | – | – | – | 7,6 | 4 | – |
| 2 | – | – | 8,7,4,6 | – | – | – | – | 8,7,4,6 | – | – |
| 3 | – | – | 7,6,11 | 6,5 | 5,4 | – | – | – | – | – |
| 4 | – | – | 12,8,7,11 | 6,5,4,7 | – | – | – | – | – | – |
| 5 | – | – | 13,12,9,8,7,5,4,11,6 | – | – | – | – | – | – | – |
| 6 | – | – | 7 | 7 | 5 | – | – | 7 | 7 | – |

FIG.5

| SUB-FRAME INDEX | | | | | | | | | |
|---|---|---|---|---|---|---|---|---|---|
| 0 | 1 | 2 | 3 | 4 | 5 | 6 | 7 | 8 | 9 |
| D | S | U | U | D2D | D | S | U | U | U |

Data Tx
[n]

Ack/Nack
[n+4]

FIG.29

| FRAME | SUB-FRAME INDEX | | | | | | | | | |
|---|---|---|---|---|---|---|---|---|---|---|
| CONFIGURATION | 0 | 1 | 2 | 3 | 4 | 5 | 6 | 7 | 8 | 9 |
| 0 | D | S | U | U/D2D | U | D | S | U | U/D2D | U |
| 1 | D | S | U | U/D2D | D | D | S | U | U/D2D | D |
| 2 | D | S | U/D2D | D | D | D | S | U/D2D | D | D |
| 3 | D | S | U | U/D2D | U | D | D | D | D | D |
| 4 | D | S | U | U/D2D | D | D | D | D | D | D |
| 5 | D | S | U/D2D | D | D | D | D | D | D | D |
| 6 | D | S | U | U | U | D | S | U | U/D2D | D |

FIG. 30

| FRAME CONFIGURATION | SUB-FRAME INDEX (n) | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | - | - | - | - | - | 4 |
| 1 | | | 7,6 | 4 | | | | 6 | 4 | |
| 1-D2D | | | 8,7,6 | - | | | | 7,6 | - | |
| 2 | | | 8,7,4,6 | | | | | 8,7,6 | | |
| 2-D2D | | | 13,12,11, 9,8,7,4,6 | | | | | 13,12,11, 9,8,7,4,6 | | |
| 3 | | | 7,6,11 | 6,5 | 5,4 | | | | | |
| 3-D2D | | | 11,7,6,5 | 6,5,4,7 | 6,5,4 | | | | | |
| 4 | | | 12,8,7,11 | | | | | | | |
| 4-D2D | | | 13,12,11, 8,7,6,5,4 | | | | | | | |
| 5 | | | 13,12,11, 7,5,4,11,6 | | | | | | | |
| 6 | | | 7 | 7 | 5 | | | | 7 | |
| 6-D2D | | | 7,6 | - | | | | 7 | - | |

FIG.38

| FRAME CONFIGURATION | SUB-FRAME INDEX | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U/D2D | D | S | U | U/D2D | | |
| 1 | D | S | U/D2D | D | D | S | U/D2D | D | | |
| 2 | D | S | U | D | D | D | S | U | D | D |
| 3 | D | S | U | U/D2D | D | D | D | D | D | D |
| 4 | D | S | U/D2D | D | D | D | D | D | D | D |
| 5 | D | S | U | D | D | D | D | D | D | D |
| 6 | D | S | U | U/D2D | D | S | U | U | D | |

FIG. 39

| FRAME CONFIGURATION | \multicolumn{10}{c}{SUB-FRAME INDEX (n)} |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 0-D2D B | — | — | 7,6 | — | — | — | — | 7,6 | — | — |
| 1 | — | — | 7,6 | 4 | — | — | — | 7,6 | 4 | — |
| 1-D2D B | — | — | 12,11,8 | 8,7,4 | — | — | — | 12,11,8 | 8,7,4 | — |
| 2 | — | — | 8,7,4,6 | — | — | — | — | 8,7,4,6 | — | — |
| 3 | — | — | 7,6,11 | 6,5 | 5,4 | — | — | — | — | — |
| 3-D2D B | — | — | 13,12,11,7,6,5,4 | 6,5,4,7 | — | — | — | — | — | — |
| 4 | — | — | 12,8,7,11 | — | — | — | — | — | — | — |
| 5 | — | — | 13,12,9,8,7,5,4,11,6 | 7 | 5 | — | — | — | — | — |
| 6 | — | — | 7 | 7 | — | — | — | 7 | 7 | — |
| 6-D2D B | — | — | 7,6 | — | — | — | — | 8,7 | 7 | — |

FIG. 40

| FRAME CONFIGURATION | SUB-FRAME INDEX (n) | | | | | | | | | |
|---|---|---|---|---|---|---|---|---|---|---|
| | 0 | 1 | 2 | 3 | 4 | 5 | 6 | 7 | 8 | 9 |
| 0 | - | - | 6,[5] | [5],[4] | 4 | - | - | 6,[5] | [5],[4] | 4 |
| 1 | - | - | 7,6 | [6],[5],4 | - | - | - | 7,6 | [6],[5],4 | - |
| 2 | - | - | 8,7,6,[5],4 | - | - | - | - | 8,7,6,[5],4 | - | - |
| 3 | - | - | 11,[10],[9],[8],7,6 | 6,5 | 5,4 | - | - | - | - | - |
| 4 | - | - | 12,11,[10],[9],8,7 | - | - | - | - | - | - | - |
| 5 | - | - | 13,12,11,[10],9,8,7,6,5,4 | - | - | - | - | - | - | - |
| 6 | - | - | [8],7 | 7,[6] | [6],5 | - | - | 7 | 7,[6],[5] | - |

FIG. 41

| FRAME CONFIGURATION | \multicolumn{10}{c}{SUB-FRAME INDEX (n)} |
| --- | --- | --- | --- | --- | --- | --- | --- | --- | --- | --- |
| | 0 | 1 | 2 | 3 | 4 | 5 | 6 | 7 | 8 | 9 |
| 0 | – | – | 6,5 | 5,4 | 4 | – | – | 6,5 | 5,4 | 4 |
| 0-D2D-CA | | | 6,5,4 | | | | | 6,5,4 | | |
| 1 | – | – | 7,6 | 6,5,4 | – | – | – | 7,6 | 6,5,4 | – |
| 1-D2D-CA | | | 8,7,6,5,4 | | | | | 8,7,6,5,4 | 8,7,4 | |
| 2 | – | – | 8,7,6,5,4 | – | – | – | – | 8,7,6,5,4 | – | – |
| 2-D2D-CA | | | 13,12,11,10,9,8,7,6,5,4 | | | | | 13,12,11,10,9,8,7,6,5,4 | | |
| 3 | – | – | 11,10,9,8,7,6 | 6,5 | 5,4 | – | – | – | – | – |
| 4 | – | – | 12,11,10,9,8,7 | 6,5,4,7 | 7,6,5,4 | – | – | – | – | – |
| 4-D2D-CA | | | 13,12,11,10,9,8,7,6,5,4 | | | | | | | |
| 5 | – | – | 13,12,11,10,9,8,7,6,5,4 | – | – | – | – | – | – | – |
| 6 | – | – | 8,7 | 7,6 | 6,5 | – | – | 7 | 7,6,5 | – |
| 6-D2D-CA | | | | | | | | 7,6,5,4 | | |

TERMINAL AND METHOD FOR ALLOCATING RESOURCE

CROSS-REFERENCE TO RELATED APPLICATION

This application claims the benefit of priority to Korean Patent Application No. 10-2014-0186676, filed on Dec. 23, 2014 in the Korean Intellectual Property Office, the disclosure of which is incorporated herein in its entirety by reference.

BACKGROUND OF THE INVENTION

Field of the Invention

The present disclosure relates to a terminal and a method for allocating a resource, and more particularly, to a terminal in a wireless communication system and a method for allocating a resource thereof.

Description of the Related Art

With the supply and increase of a smart terminal, mobile data based on a multi-media service has been rapidly increased. This accelerates the development of a mobile communication technology, and enables a large capacity transmission technology to be applied to a mobile communication network. Thus, since a lack of frequency is increased as a demand for wireless communication increases, it is significantly difficult to allocate a limited frequency by a base station. Accordingly, there is a need for methods for efficiently using the frequency. Among the methods, a device-to-device (D2D) technology is spotlighted, and it is a communication technology for directly exchanging data without passing through a base station after setting a communication link between devices. The base station may analyze a state of the device-to-device by continuously exchanging a control signal with a terminal, and control the state of the device-to-device using the analyzed state information.

Meanwhile, in order to perform such a device-to-device service, a radio resource for the device-to-device service should be separately allocated in an existing radio resource, and the device-to-device service may be provided without interference between a communication, between an existing base station and a terminal, and the device-to-device service. To this end, up to now, it is considered that a part of uplink (UL) resources for transmitting information to the base station from the terminal is used as a radio resource for the device-to-device service. However, it is necessary to discuss a resource, which is to be allocated to provide the device-to-device service, from among the UL resources of radio resource between the terminal and the base station. Further, when a specific UL resource is allocated to the device-to-device service, there is a need for checking a HARQ transmission process between the terminal and the base station.

SUMMARY OF THE INVENTION

The present disclosure has been made in view of the above problems, and provides a terminal capable of providing a method for efficiently allocating a resource for device-to-device communication between terminals in a wireless communication system, and a method for allocating a resource thereof.

In accordance with an aspect of the present disclosure, a method for allocating a resource of a terminal includes: receiving downlink data from a base station; and allocating a resource for a device-to-device communication to a sub-frame by considering a hybrid ARQ (HARQ) transmission delay with respect to the received downlink data. Allocating a resource for a device-to-device communication to a sub-frame includes allocating the resource for the device-to-device communication to an uplink sub-frame. Allocating a resource for a device-to-device communication to a sub-frame includes allocating the resource for the device-to-device communication to a sub-frame so that a maximum HARQ transmission delay among HARQ transmissions preformed in the same frame configuration may be minimized. The method further includes allocating the resource for the HARQ transmission to a sub-frame by considering a sub-frame to which the device-to-device communication is allocated. Allocating the resource for the HARQ transmission to a sub-frame by considering a sub-frame to which the device-to-device communication is allocated includes allocating the resource for the HARQ transmission to a next sub-frame or a previous sub-frame of a sub-frame to which the resource for the device-to-device communication is allocated. Allocating the resource for the HARQ transmission to a sub-frame by considering a sub-frame to which the device-to-device communication is allocated includes allocating the resource for the HARQ transmission to a sub-frame different from the next sub-frame or the previous sub-frame when the resource for the HARQ transmission of a certain level or greater is allocated to the next sub-frame. Allocating a resource for a device-to-device communication to a sub-frame includes allocating the resource for the device-to-device communication to a sub-frame having a greatest index difference from a special sub-frame when a maximum HARQ transmission delay of HARQ transmissions performed under the same frame configuration is identical with each other regardless of an index of a sub-frame to which the resource for the device-to-device communication is allocated. Allocating a resource for a device-to-device communication to a sub-frame includes continuously allocating the resource for device-to-device communication to a sub-frame. The HARQ transmission is performed in a carrier aggregation system.

In accordance with another aspect of the present disclosure, a terminal includes: a communication unit configured to receive downlink data from a base station; and a resource allocating unit configured to allocate a resource for a device-to-device communication to a sub-frame by considering a hybrid ARQ (HARQ) transmission delay with respect to the received downlink data. The resource allocating unit allocates the resource for the device-to-device communication to an uplink sub-frame. The resource allocating unit allocates the resource for the device-to-device communication to a sub-frame so that a maximum HARQ transmission delay among HARQ transmissions preformed in the same frame configuration may be minimized. The resource allocating unit allocates the resource for the HARQ transmission to a sub-frame by considering a sub-frame to which the device-to-device communication is allocated. The resource allocating unit allocates the resource for the HARQ transmission to a next sub-frame or a previous sub-frame of a sub-frame to which the resource for the device-to-device communication is allocated. The resource allocating unit allocates the resource for the HARQ transmission to a sub-frame different from the next sub-frame or the previous sub-frame when the resource for the HARQ transmission of a certain level or greater is allocated to the next sub-frame. The resource allocating unit allocates the resource for the device-to-device communication to a sub-frame having a greatest index difference from a special sub-frame when a maximum HARQ transmission delay of HARQ transmissions performed under the same frame configuration is identical with each other regardless of an index of a sub-frame to which the resource for the device-to-device communication is allocated.

The terminal and the method for allocating a resource thereof according to an embodiment of the present disclosure may provide a method of efficiently allocating a resource for device-to-device communication between terminals in a wireless communication system.

In addition, the terminal and the method for allocating a resource thereof according to an embodiment of the present disclosure may reduce the performance degradation of the wireless communication system and may reduce the HARQ transmission delay.

BRIEF DESCRIPTION OF THE DRAWINGS

The objects, features and advantages of the present disclosure will be more apparent from the following detailed description in conjunction with the accompanying drawings, in which:

FIG. 2 is a diagram illustrating a configuration of a frame in a TDD system;

FIG. 3 is a diagram illustrating data transmission and HARQ transmission in a TDD system;

FIG. 4 is a diagram illustrating resource allocation for HARQ transmission according to a configuration of a frame in a TDD system;

FIG. 5 is a diagram illustrating resource allocation for device-to-device communication in a TDD system;

FIG. 29 is a diagram illustrating a frame configuration reflecting a method for allocating a resource of a terminal according to an embodiment of the present disclosure;

FIG. 30 is a diagram illustrating resource allocation for HARQ transmission according to a frame configuration reflecting a method for allocating a resource of a terminal according to an embodiment of the present disclosure;

FIG. 38 is a diagram illustrating a frame configuration reflecting a method for allocating a resource of a terminal in a burst mode according to an embodiment of the present disclosure;

FIG. 39 is a diagram illustrating resource allocation for HARQ transmission according to a frame configuration reflecting a method for allocating a resource of a terminal in a burst mode according to an embodiment of the present disclosure;

FIG. 40 is a diagram illustrating resource allocation for HARQ transmission according to a frame configuration in a carrier aggregation system; and FIG. 41 is a diagram illustrating resource allocation for HARQ transmission according to a frame configuration reflecting a method for allocating a resource of a terminal in a carrier aggregation system according to an embodiment of the present disclosure.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

In a following description, it is assumed that a terminal generally represents a mobile or fixed user terminal such as a user equipment (UE) and a mobile station (MS). The terminal may include devices such as a tablet personal computer (PC), a smart phone, a digital camera, a portable multimedia player (PMP), a media player, a portable game console, and a personal digital assistant (PDA) as well as a mobile communication terminal. It is assumed that the base station generally represents an optional node of a network end, such as a Node B, an eNode B, a base station and the like, communicating with the terminal.

Further, the UE in a wireless communication system may receive information from the base station through a downlink and may transmit information through an uplink. The information transmitted or received by the terminal may include data and various control information. Various physical channels may be provided according to a type and purpose of the information transmitted or received by the terminal.

Further, following embodiments are illustrated on the assumption that communication is performed between UE and a base station in a Long Term Evolution-Time Division Duplex (LTE-TDD) system. However, it is for illustration purpose only. Embodiments of the present disclosure may also be applicable to a Long Term Evolution-Frequency Division Duplex (LTE-FDD) system.

Hereinafter, a frame configuration of the LTE-TDD system and resource allocation for data transmission and HARQ transmission are firstly described. Further, hereinafter, the resource may mean a frequency, but the present disclosure is not limited thereto.

Figure 1:
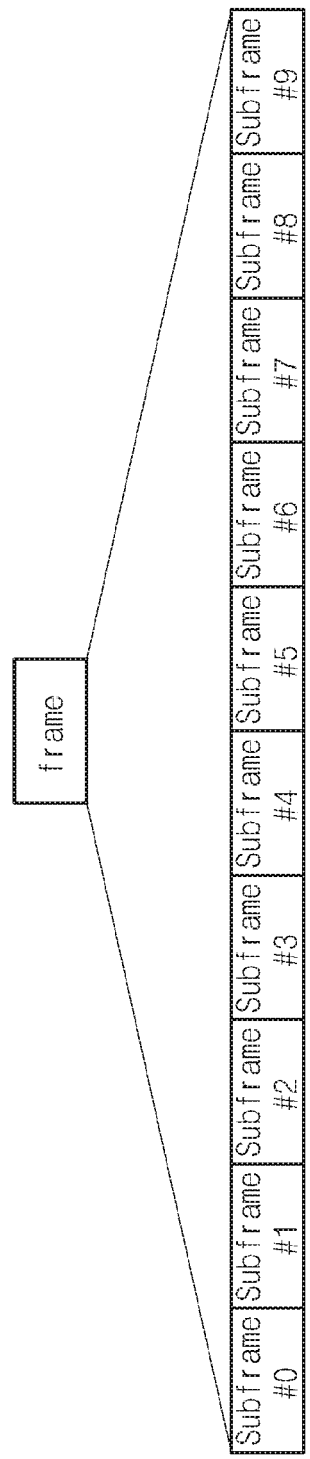
FIG. 1 is a diagram illustrating a frame structure of a wireless communication system.

FIG. 1 is a diagram illustrating a frame structure of a wireless communication system. FIG. 2 is a diagram illustrating a configuration of a frame in a TDD system.

Referring to FIG. 1, a single frame in a wireless communication system may include ten sub-frames. Communication in the wireless communication system may be configured of a downlink (DL) from a base station to a terminal and an uplink (UL) from the terminal to the base station. A FDD method in communication between the base station and the terminal is a method that transmits data by controlling a frequency of downlink of a frame to be different from a frequency of uplink of the frame. The TDD method is a method that transmits data by dividing a frame into a downlink sub-frame and an uplink sub-frame on a time axis.

FIG. 2 illustrates an example of a configuration of a frame in a TDD system. Each sub-frame in the TDD system may be allocated in uplink or downlink. The sub-frame allocated in the uplink may refer to an uplink sub-frame, and the sub-frame allocated in the downlink may refer to a downlink sub-frame. Further, a special sub-frame may include a downlink pilot time slot (DwPTS), a guard period (GP), and an uplink pilot time slot (UpPTS).

That is, in FIG. 2, D represents a downlink sub-frame, U represents an uplink sub-frame, and S represents a special sub-frame.

FIG. 3 is a diagram illustrating data transmission and HARQ transmission in a TDD system.

For example, it may be understood that FIG. 3 illustrates an example of a downlink HARQ transmission process in a system having a TDD frame configuration shown in FIG. 2.

First, the HARQ transmission is described. When transmitting/receiving data in the wireless communication system, a reception end should report the success or failure of the data reception to a transmission end. When the data reception is successful, the reception end may transmit a ACKnowledgement (ACK) signal to the transmission end so that the transmission end may transmit new data. When the data reception fails, the reception end may transmit a negative ACKnowledgement (NACK) to the transmission end so that the transmission end may retransmit the data. The above operation refers to an Automatic Repeat and reQuest (ARQ). The ARQ operation may be combined with a channel coding method to suggest a hybrid ARQ (HARQ).

Referring to FIG. 3, for example, since a zero-th sub-frame (i.e., hereinafter, refer to a sub-frame having a sub-frame index value of 0) is a downlink sub-frame, the base station may transmit data to the terminal. The terminal may receive data of the zero-th sub-frame and transmit an ACK or NACK for the data of the zero-th sub-frame to a fourth sub-frame which is after four sub-frames from the zero-th sub-frame. When the ACK is received, the base station may determine that the terminal normally receives the data. When the NACK is received, the base station may determine that the data is not normally received and retransmit corresponding data in the zero-th sub-frame of a next frame (since the frame includes 10 sub-frames) which is after 6 sub-frames from the fourth sub-frame.

That is, the ACK/NACK reception from the first data transmission may be accomplished after four sub-frames by considering a time for determining the normal reception of the terminal, and the data retransmission after the ACK/NACK reception may be accomplished after 6 sub-frames after the ACK/NACK reception. In addition to a time delay for an internal process of the base station and the terminal, in the case of downlink data transmission, since the ACK/NACK may be transmitted in the uplink sub-frame, and data may be retransmitted in the downlink sub-frame, by considering this, a HARQ transmission process of a certain pattern according to a frame configuration may be determined.

Meanwhile, an index of a sub-frame for transmitting the ACK/NACK may be determined by considering a sub-frame configuration, an available bit number of the ACK/NACK, and the like, and the retransmission timing of the ACK/NACK and the data may be determined according to a sub-frame configuration.

FIG. 4 is a diagram illustrating resource allocation for the HARQ transmission according to a frame configuration in a TDD system.

In an aspect, it may be understood that FIG. 4 illustrates the transmission timing of the ACK/NACK according to a frame configuration of a TDD system.

Referring to FIG. 4, a sub-frame index n may have a value ranging from 0 to 9. Assuming that the number indicated in each cell of FIG. 4 is k, the n-th sub-frame may transmit the ACK/NACK for the data transmitted in a (n−k)-th sub-frame. For example, in the case of a seventh sub-frame of a zero-th frame configuration, since n=7 and k=6, it can be known that n−k=1. That is, it means that the ACK/NACK for the data transmitted in a first sub-frame may be transmitted from the seventh sub-frame.

FIG. 5 is a diagram illustrating resource allocation for device-to-device communication in a TDD system.

Referring to FIG. 5, in a general wireless communication system (e.g., TDD system), a frame configuration and an HARQ transmission process may be already determined in association with the data transmission/reception and the HARQ transmission between the base station and the terminal. In order to allocate a resource for the device-to-device communication on the frame configuration and the process, it is required to correct the frame configuration and the HARQ transmission process.

In detail, the ACK/NACK for the downlink data transmitted to the zero-th sub-frame in a zero-th frame configuration may be already determined to be transmitted through a fourth sub-frame. When the fourth sub-frame is allocated as a resource for device-to-device communication, it may be impossible to transmit the ACK/NACK in the fourth sub-frame.

Accordingly, hereinafter, a method for allocating a resource for device-to-device communication by considering a frame configuration and an HARQ transmission process of a wireless communications system and a method for allocating a resource for HARQ transmission according to resource allocation for the device-to-device communication are described.

Figure 6:
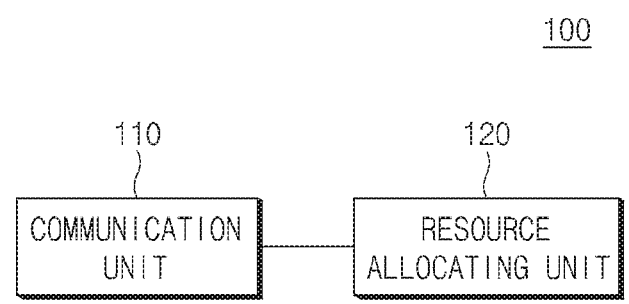
FIG. 6 is a block diagram illustrating a terminal according to an embodiment of the present disclosure.
Figure 7:
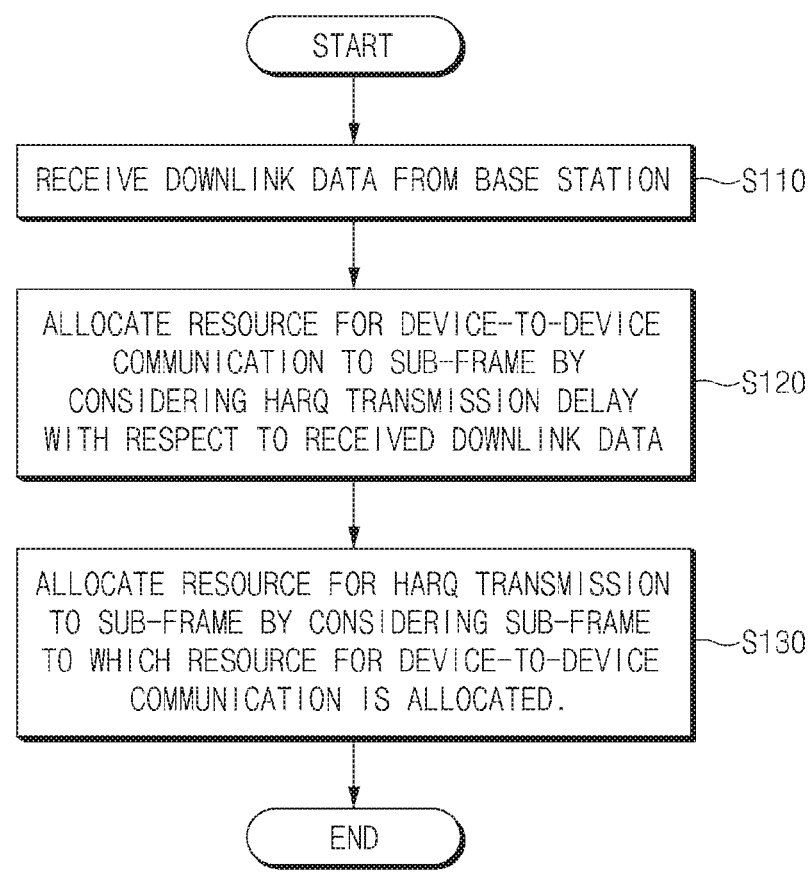
FIG. 7 is a flowchart illustrating a method for allocating a resource of a terminal according to an embodiment of the present disclosure.

FIG. 6 is a block diagram illustrating a terminal according to an embodiment of the present disclosure. FIG. 7 is a flowchart illustrating a method for allocating a resource of a terminal according to an embodiment of the present disclosure.

Referring to FIG. 6 and FIG. 7, the terminal 100 according to an embodiment of the present disclosure may include a communication unit 110 and a resource allocating unit 120. An operation and a function of the communication unit 110 and the resource allocating unit 120 are described with reference to FIG. 7.

The method for allocating a resource of a terminal according to an embodiment of the present disclosure may include: receiving downlink data from a base station (S110); allocating a resource for device-to-device communication to a sub-frame by considering a hybrid ARQ (HARQ) transmission delay for the received downlink data (S120); and allocating a resource for HARQ transmission to the sub-frame by considering the sub-frame to which the resource for device-to-device communication is allocated.

At step S110, the communication unit 110 may receive downlink data from the base station (not shown).

At step S120, the resource allocating unit 120 may allocate the resource for the device-to-device (D2D) communication to the sub-frame by considering the HARQ transmission delay for the received downlink data. For example, the resource allocating unit 120 may allocate the resource for the device-to-device communication to the uplink sub-frame. For example, the resource allocating unit 120 may allocate the resource for the device-to-device communication to the sub-frame so that maximum HARQ transmission delay among HARQ transmissions performed in the same frame configuration may be minimized. In this case, the HARQ delay may signify the number of sub-frames or a time for a first sub-frame which can be retransmitted after the ACK/NACK transmission for the data reception. This can be clearly understood with reference to following FIG. 8 to FIG. 14.

In addition, when maximum HARQ transmission delays of HARQ transmissions performed under the same frame configuration are the same regardless of an index of a sub-frame to which the resource for the device-to-device communication is allocated, the resource allocating unit 120 may allocate a resource for the device-to-device communication to a sub-frame having the greatest index. This can be clearly understood with reference to FIG. 19 to FIG. 22.

In addition, the resource allocating unit 120 may continuously allocate the resource for the device-to-device communication to the sub-frame. The continuous resource allocation may be understood as an operation in a burst mode in a certain sense. This can be clearly understood with reference to FIG. 31 to FIG. 39.

At step S130, the resource allocating unit 120 may allocate the resource for the HARQ transmission to the sub-frame by considering a sub-frame to which the resource for the device-to-device communication is allocated. For example, the resource allocating unit 120 may allocate the resource for the HARQ transmission to a next sub-frame of the sub-frame to which the resource for the device-to-device communication is allocated. In addition, when a certain level or more resource for the HARQ transmission is allocated to the next sub-frame, the resource allocating unit 120 may allocate the resource for the HARQ transmission to a sub-frame different from the next sub-frame. This will be clearly understood with reference to a description of FIG. 15 to FIG. 18 and FIG. 23 to FIG. 30.

FIG. 8 to FIG. 11 are diagrams illustrating a method for allocating a resource of a terminal in a frame configuration 0 according to an embodiment of the present disclosure.

Figure 8:
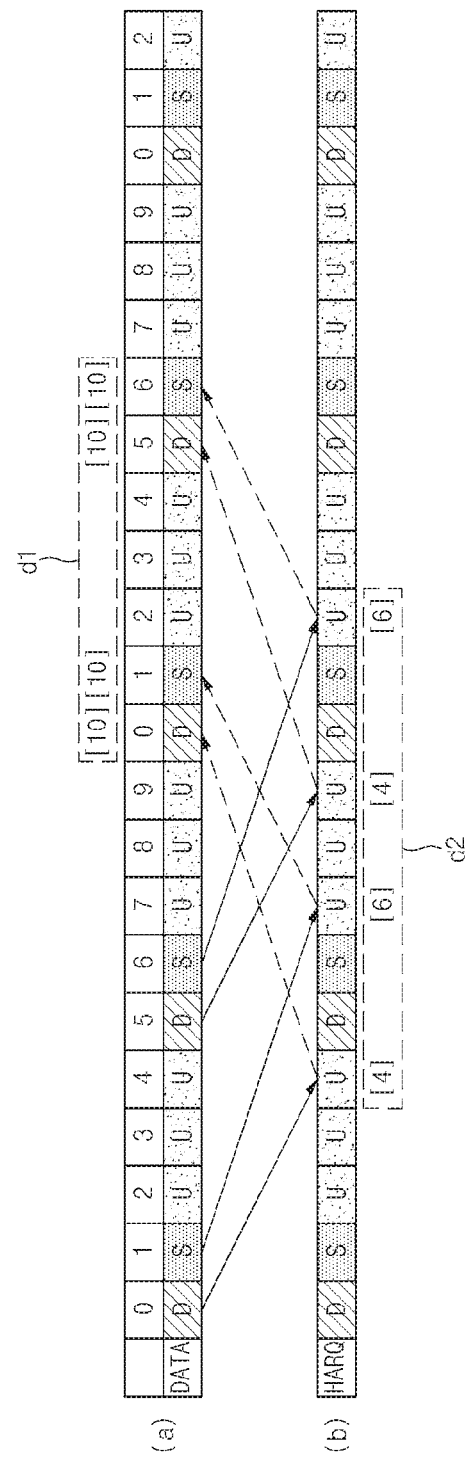
FIG. 8 to FIG. 11 are diagrams illustrating a method for allocating a resource of a terminal in a frame configuration 0 according to an embodiment of the present disclosure.

First, FIG. 8 illustrates the reception of downlink data in the existing zero-th TDD frame configuration (see FIG. 4), the relevant ACK/NACK transmission, and the number of the sub-frame up to a first retransmission possible sub-frame.

In detail, referring to FIG. 8, FIG. 8A illustrates a reception process of data. FIG. 8B illustrates a transmission process of the ACK/NACK. A reference numeral d1 of a top end of FIG. 8A denotes a HARQ delay of each case. A reference numeral d2 of a bottom end of FIG. 8B denotes a delay up to the ACK/NACK transmission. A solid line represents a connection between a data reception and a sub-frame for transmitting a relevant ACK/NACK. The dotted line represents a connection between a ACK/NACK transmission and a first sub-frame which can be retransmitted. The above description can be identically applied to FIG. 9 to FIG. 28 and FIG. 31 to FIG. 37, and may be omitted to avoid an overlap.

For example, a resource for the ACK/NACK transmission for the data received from the zero-th sub-frame may be allocated to a fourth sub-frame, and a resource for the data retransmission according to the NACK transmission may be allocated to the zero-th sub-frame of a next frame. In the case of the zero-th frame configuration, four data transmission and HARQ transmission process exist in a single frame. In each case, every maximum HARQ delay may become 10 sub-frames.

Figure 9:
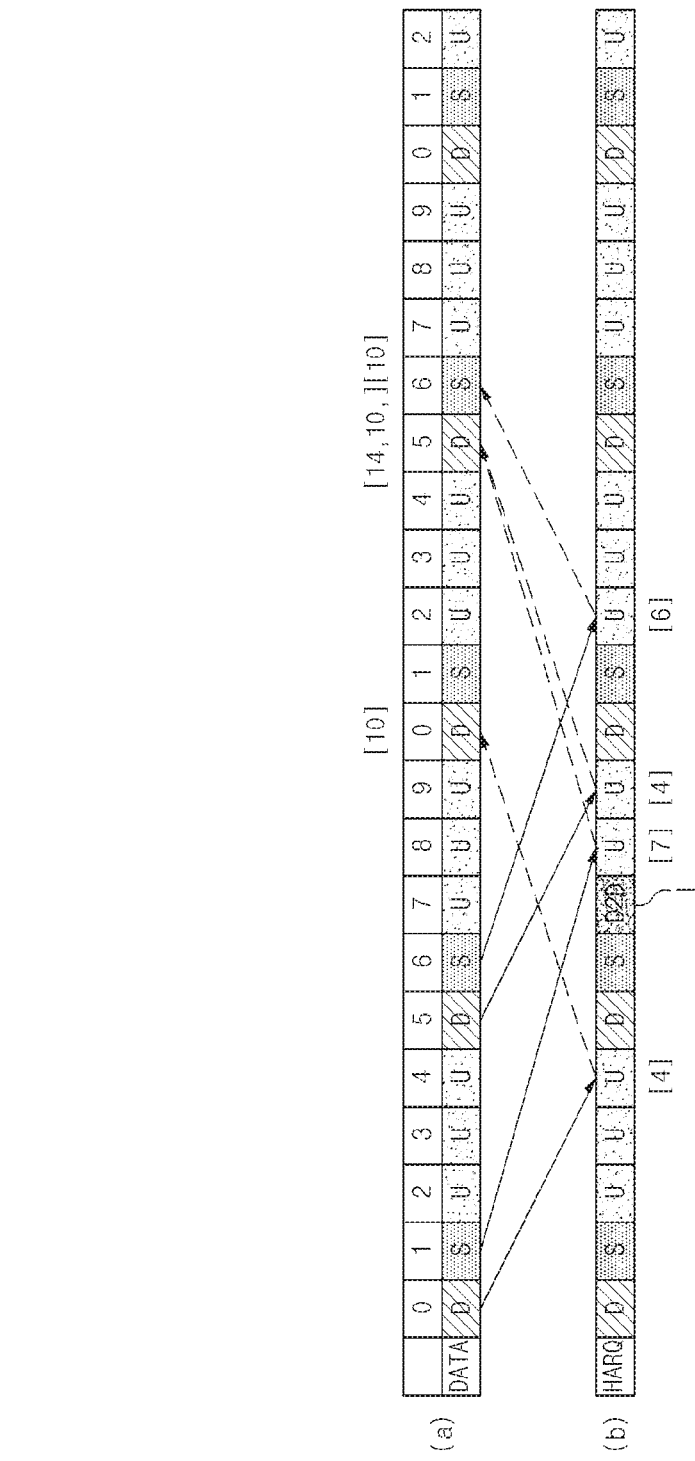
Figure 10:
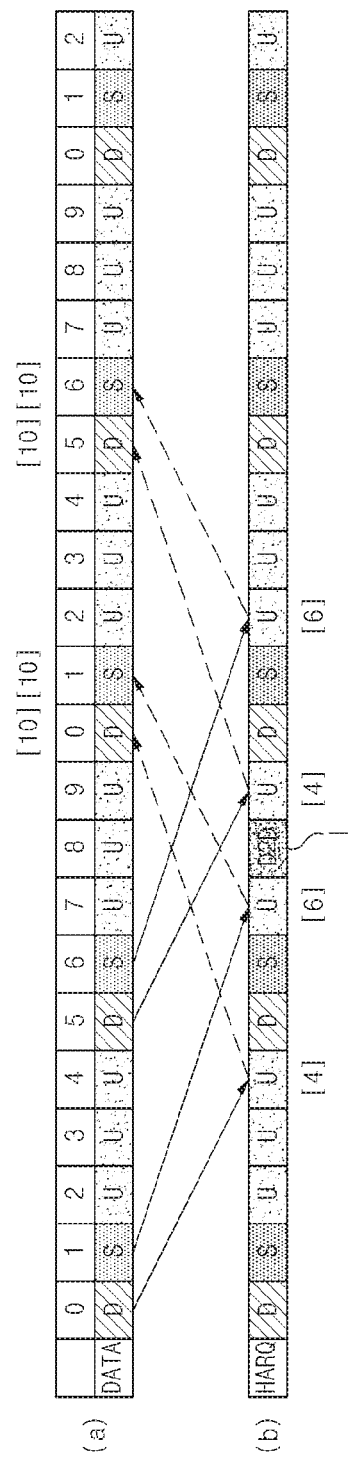
Figure 11:
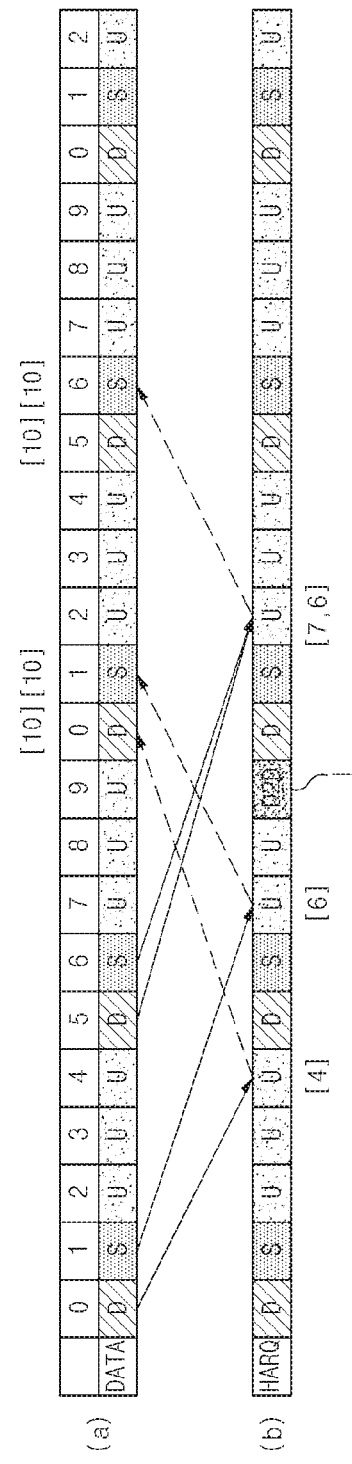

FIG. 9 to FIG. 11 illustrate a case in which a resource for the device-to-device communication may be allocated with respect to the zero-th frame configuration. Since a configuration of the zero-th to fourth sub-frames in the zero-th frame configuration is identical with a configuration of the fifth to ninth sub-frames, FIG. 9 to FIG. 11 illustrate only a case of allocating a resource for device-to-device communication to seventh to ninth sub-frames. However, the second to fourth sub-frames may also be applicable.

Referring to FIG. 9, the data reception and the HARQ transmission process are shown when a resource I for the device-to-device communication is allocated to the seventh sub-frame with respect to the zero-th frame configuration. Accordingly, the ACK/NACK (see FIG. 8) for the data reception of the first sub-frame previously transmitted in the seventh sub-frame may be transmitted to an eighth sub-frame, and a relevant data retransmission may be performed in a fifth sub-frame of a next frame. This case may be defined as maximum HARQ transmission delay when the resource for the device-to-device communication is allocated to the seventh sub-frame with respect to the zero-th frame configuration. That is, when the resource for the device-to-device communication is allocated to the seventh sub-frame with respect to the zero-th frame configuration, the maximum HARQ transmission delay may become 14.

Referring to FIG. 10, when the resource I for the device-to-device communication is allocated to the eighth sub-frame with respect to the zero-th frame configuration, the data transmission and the HARQ process are shown. In this case, since there is no ACK/NACK previously transmitted in the eighth sub-frame, the existing HARQ transmission process may be maintained, and the maximum HARQ transmission delay may become 10. That is, when the resource for the device-to-device communication is allocated to the eighth sub-frame with respect to the zero-th frame configuration, the maximum HARQ transmission delay may become 10.

Referring to FIG. 11, when the resource I for the device-to-device communication is allocated to the ninth sub-frame with respect to the zero-th frame configuration, the data transmission and the HARQ transmission process are shown. In this case, the ACK/NACK for the fifth sub-frame data transmitted in the ninth sub-frame may be transmitted to a second sub-frame of a next frame, and a relevant data retransmission can be accomplished in a sixth sub-frame of the next frame. This case may be defined as maximum HARQ transmission delay when the resource for the device-to-device communication is allocated to the ninth sub-frame with respect to the zero-th frame configuration. As described above, when the resource for the device-to-device communication is allocated to the ninth sub-frame with respect to the zero-th sub-frame configuration, the maximum HARQ delay may become 11.

As a result, as shown in FIG. 9 to FIG. 11, the resource allocating unit 120 of the terminal 100 may allocate the resource for the device-to-device communication to the eighth sub-frame or the third sub-frame so that the maximum HARQ transmission delay among HARQ transmissions performed in a frame configuration with respect to the zero-th frame configuration may be minimized.

Figure 12:
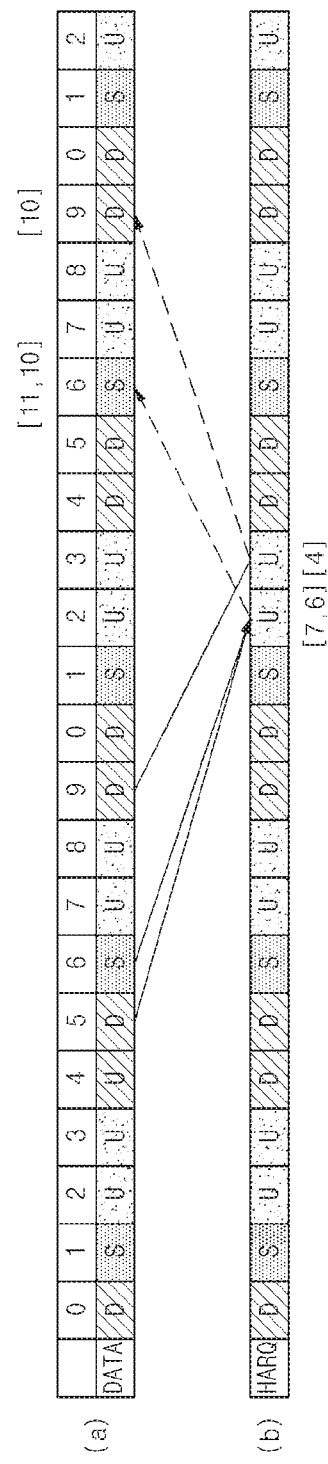
FIG. 12 to FIG. 14 are diagrams illustrating a method for allocating a resource of a terminal in a first frame configuration according to an embodiment of the present disclosure.
Figure 13:
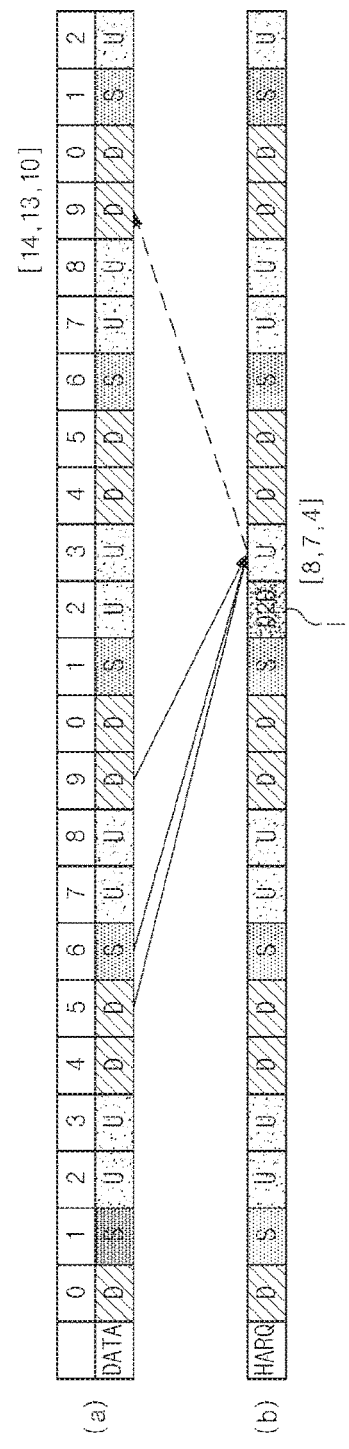
Figure 14:
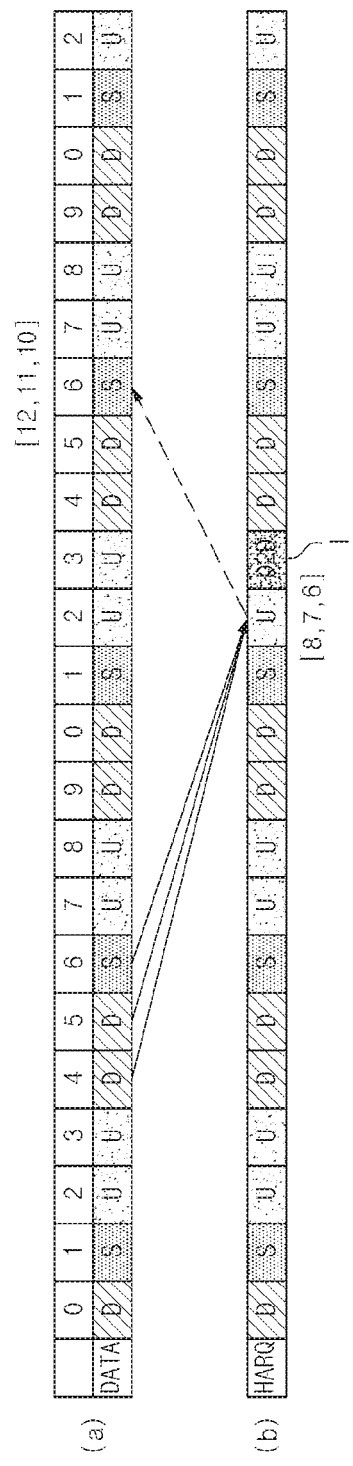

FIG. 12 to FIG. 14 are diagrams illustrating a method for allocating a resource of a terminal in a first frame configuration according to an embodiment of the present disclosure.

First, FIG. 12 illustrates reception of downlink data in the existing TDD frame configuration (see FIG. 4), a relevant ACK/NACK transmission, and the number of the sub-frame up to a first retransmission possible sub-frame.

In detail, referring to FIG. 12, FIG. 12A illustrates a reception process of data. FIG. 12B illustrates a transmission process of the ACK/NACK.

Hereinafter, FIG. 13 and FIG. 14 illustrate a case in which the resource for the device-to-device communication may be allocated to the first frame configuration. Since a configuration of the zero-th to fourth sub-frames in the first frame configuration is identical with a configuration of the fifth to ninth sub-frames, FIG. 13 and FIG. 14 illustrate only a case of allocating a resource for device-to-device communication to the second or third sub-frame, but the seventh or eighth sub-frame may be also applicable.

Referring to FIG. 13, the data reception and the HARQ transmission process are shown when a resource I for the device-to-device communication is allocated to the second sub-frame with respect to the first frame configuration. Accordingly, the ACK/NACK (see FIG. 12) transmitted in the second sub-frame with respect to the data reception of the fifth and sixth sub-frames of the previous frame may be transmitted to the third sub-frame, and a relevant data retransmission may be performed in a ninth sub-frame. This case may be defined as maximum HARQ transmission delay when the resource for the device-to-device communication is allocated to the second sub-frame with respect to the first frame configuration.

That is, when the sub-frame allocated for the device-to-device communication is identical with the existing sub-frame allocated for the HARQ transmission, the resource allocating unit 120 of the terminal 100 may allocate the resource for the HARQ transmission to a next sub-frame of the sub-frame allocated for the device-to-device communication. As a result, when the resource for the device-to-device communication is allocated to the second sub-frame with respect to the first frame configuration, the maximum HARQ transmission delay may become 14.

Referring to FIG. 14, the data reception and the HARQ transmission process are shown when a resource I for the device-to-device communication is allocated to the third sub-frame with respect to the first frame configuration. In this case, the ACK/NACK transmitted in the third sub-frame with respect to reception of the ninth sub-frame data of the previous frame may be transmitted to a second sub-frame, and a relevant data retransmission may be accomplished in a sixth sub-frame. This case may be defined as maximum HARQ transmission delay when the resource for the device-to-device communication is allocated to the third sub-frame with respect to the first frame configuration. As described above, when the resource for the device-to-device communication is allocated to the third sub-frame with respect to the first sub-frame configuration, the maximum HARQ delay may become 12.

As a result, as shown in FIG. 13 and FIG. 14, the resource allocating unit 120 of the terminal 100 may allocate the resource for the device-to-device communication to the eighth sub-frame or the third sub-frame so that the maximum HARQ transmission delay among HARQ transmissions performed in a frame configuration with respect to the first frame configuration may be minimized.

FIG. 15 to FIG. 18 are diagrams illustrating a method for allocating a resource of a terminal in a third frame configuration according to an embodiment of the present disclosure.

Figure 15:
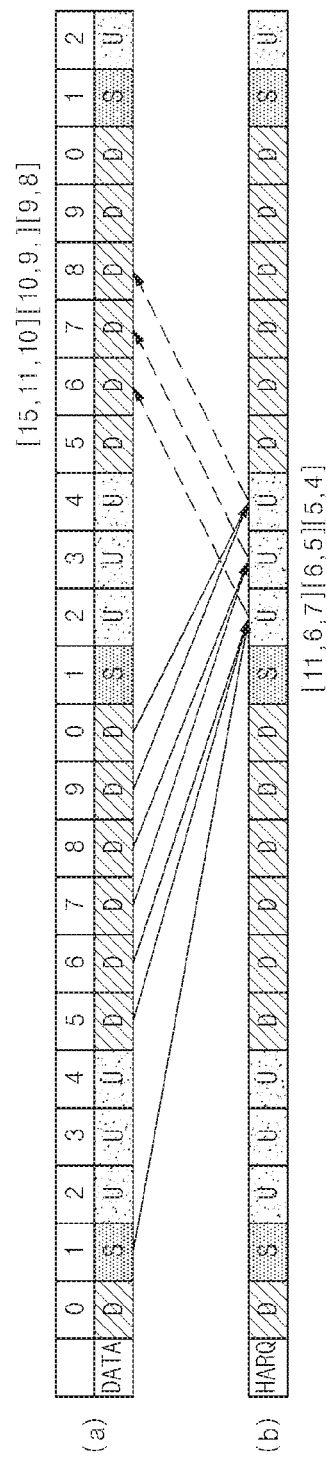
FIG. 15 to FIG. 18 are diagrams illustrating a method for allocating a resource of a terminal in a third frame configuration according to an embodiment of the present disclosure.

First, FIG. 15 illustrates the reception of downlink data in the existing third TDD frame configuration (see FIG. 4), a relevant ACK/NACK transmission, and the number of the sub-frame up to a first retransmission possible sub-frame. In detail, referring to FIG. 15, FIG. 15A illustrates a reception process of data. FIG. 15B illustrates a transmission process of the ACK/NACK.

Figure 16:
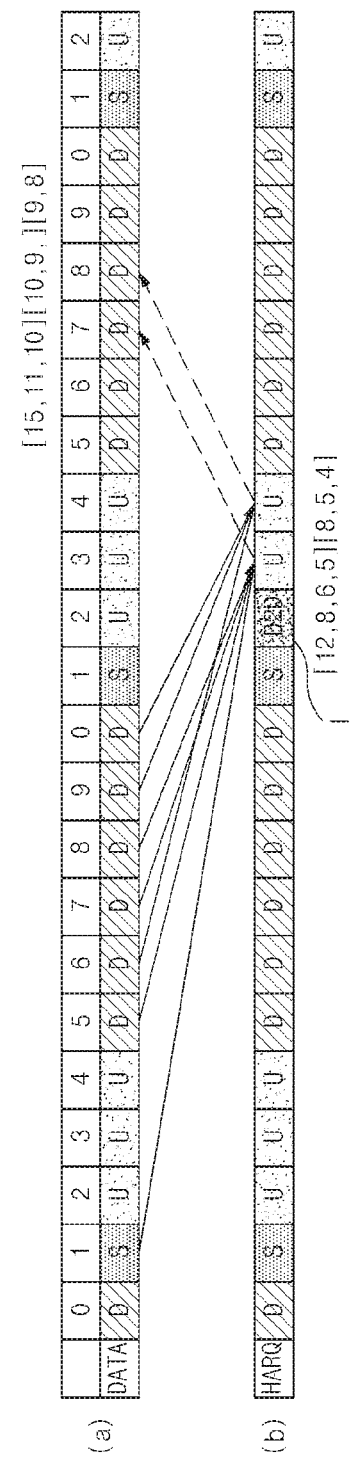
Figure 17:
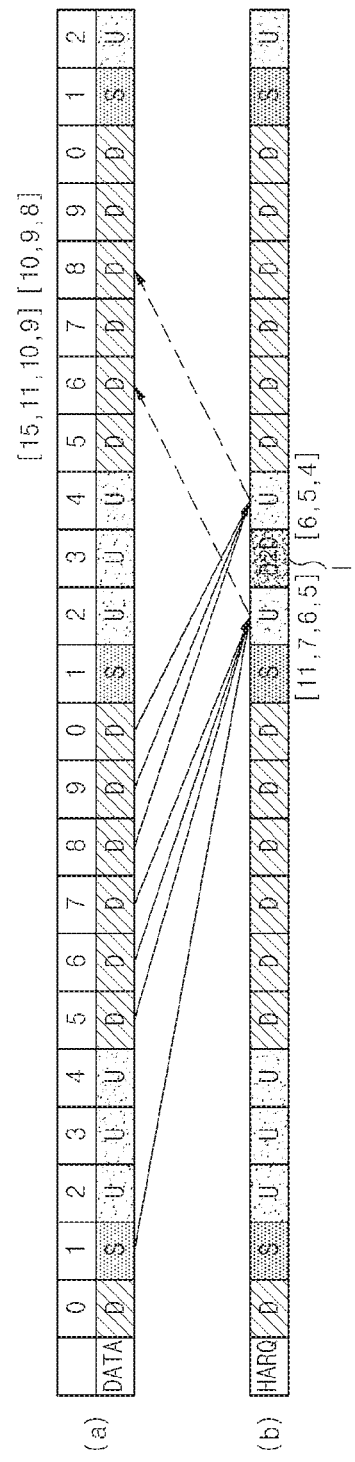
Figure 18:
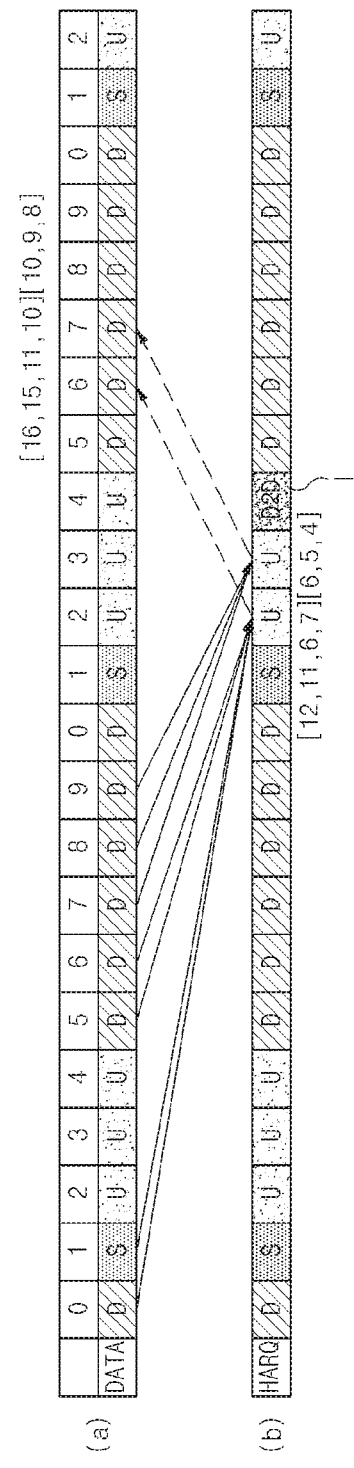

Hereinafter, FIG. 16 to FIG. 18 illustrate a case in which the resource for the device-to-device communication is allocated to the third frame configuration.

Referring to FIG. 16, the data transmission and the HARQ transmission process are shown, when the resource I for the device-to-device communication is allocated to the second sub-frame with respect to the third frame configuration. Accordingly, the ACK/NACK (see FIG. 15) transmitted from the second sub-frame with respect to the data reception of the first and fifth sub-frames of the previous frame may be transmitted to the third sub-frame, and a relevant data retransmission may be performed in a seventh sub-frame of a next frame. This case may be defined as maximum HARQ transmission delay when the resource for the device-to-device communication is allocated to the second sub-frame with respect to the third frame configuration. That is, when the resource for the device-to-device communication is allocated to the second sub-frame with respect to the third frame configuration, the maximum HARQ transmission delay may become 16.

Meanwhile, the ACK/NACK transmitted to the third sub-frame with respect to the data reception of a sixth sub-frame of a previous may be allocated to a fourth sub-frame. That is, in order to uniformly distribute HARQ transmission between sub-frames, the resource allocating unit 120 of the terminal 100 may allocate the ACK/NACK transmitted from the third sub-frame with respect to the data reception of the sixth sub-frame of the previous frame to the fourth sub-frame. Since the case of causing the maximum HARQ transmission delay is not changed in the third frame configuration according to reallocation of the sub-frame for the HARQ transmission, the system performance is not affected. Accordingly, the resource allocating unit 120 may uniformly distribute the HARQ transmission between the sub-frames while maintaining the maximum HARQ transmission delay.

Referring to FIG. 17, the data transmission and the HARQ transmission process are shown, when the resource I for the device-to-device communication is allocated to the third sub-frame with respect to the third frame configuration. In this case, the ACK/NACK transmitted from the third sub-frame with respect to the data reception of the seventh sub-frame of the previous frame may be transmitted to the second sub-frame, and a relevant data retransmission may be accomplished in a sixth sub-frame. This case may be defined as maximum HARQ transmission delay when the resource for the device-to-device communication is allocated to the third sub-frame with respect to the third frame configuration. Meanwhile, the ACK/NACK with respect to the data reception of the eighth sub-frame of the previous frame may be transmitted to the fourth sub-frame. This is to uniformly distribute the HARQ transmission between the sub-frames as shown in FIG. 16. As described above, when the resource for the device-to-device communication is allocated to the third sub-frame with respect to the third sub-frame configuration, the maximum HARQ delay may become 15.

Referring to FIG. 18, the data transmission and HARQ transmission process are shown, when the resource I for the device-to-device communication is allocated to the fourth sub-frame with respect to the third frame configuration. In this case, the ACK/NACK transmitted from the fourth sub-frame with respect to the data reception of the ninth sub-frame of the previous frame may be transmitted to a third sub-frame, and a relevant data retransmission may be accomplished in a seventh sub-frame. That is, the HARQ transmission delay for the data reception of the ninth sub-frame of the previous frame may become 8.

Meanwhile, when the resource for the device-to-device communication is allocated to the fourth sub-frame in the case of the zero-th sub-frame, the sub-frame which can transmit the ACK/NACK may become the second sub-frame of the next frame, and a relevant data retransmission may be performed in a sixth sub-frame. This case may be defined as maximum HARQ transmission delay when the resource for the device-to-device communication is allocated to the fourth sub-frame with respect to the third frame configuration. That is, when the resource for the device-to-device communication is allocated to the fourth sub-frame with respect to the third frame configuration, the maximum HARQ transmission delay may become 16.

As a result, as shown in FIG. 16 to FIG. 18, when the resource for the device-to-device communication is allocated to the third frame configuration, the resource allocating unit 120 of the terminal 100 may allocate the resource for the device-to-device communication to the third sub-frame so that the maximum HARQ transmission delay among HARQ transmissions performed in a frame configuration may be minimized.

FIG. 19 to FIG. 22 are diagrams illustrating a method for allocating a resource of a terminal in a fourth frame configuration according to an embodiment of the present disclosure.

Figure 19:
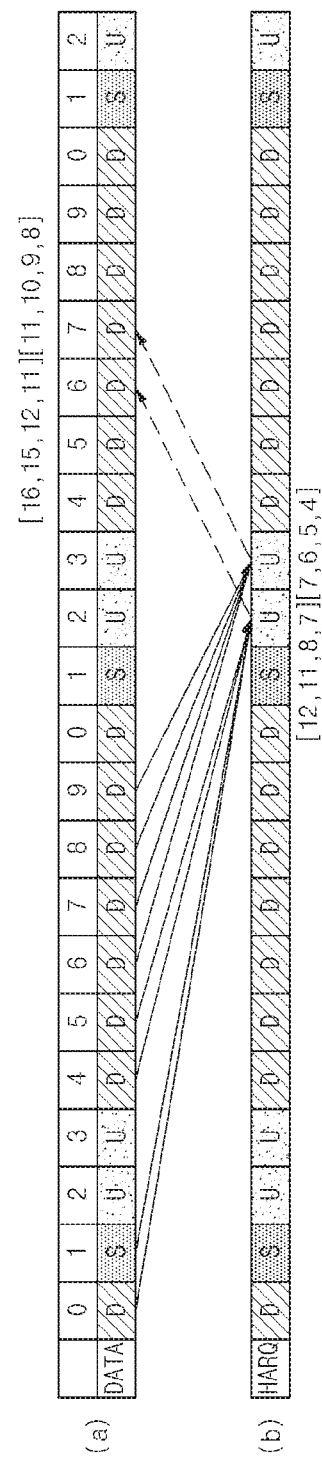
FIG. 19 to FIG. 22 are diagrams illustrating a method for allocating a resource of a terminal in a fourth frame configuration according to an embodiment of the present disclosure.

First, FIG. 19 illustrates the reception of downlink data in the existing fourth TDD frame configuration (see FIG. 4), a relevant ACK/NACK transmission, and the number of the sub-frame up to a first retransmission possible sub-frame. In detail, referring to FIG. 19, FIG. 19A illustrates a reception process of data. FIG. 19B illustrates a transmission process of the ACK/NACK.

Figure 20:
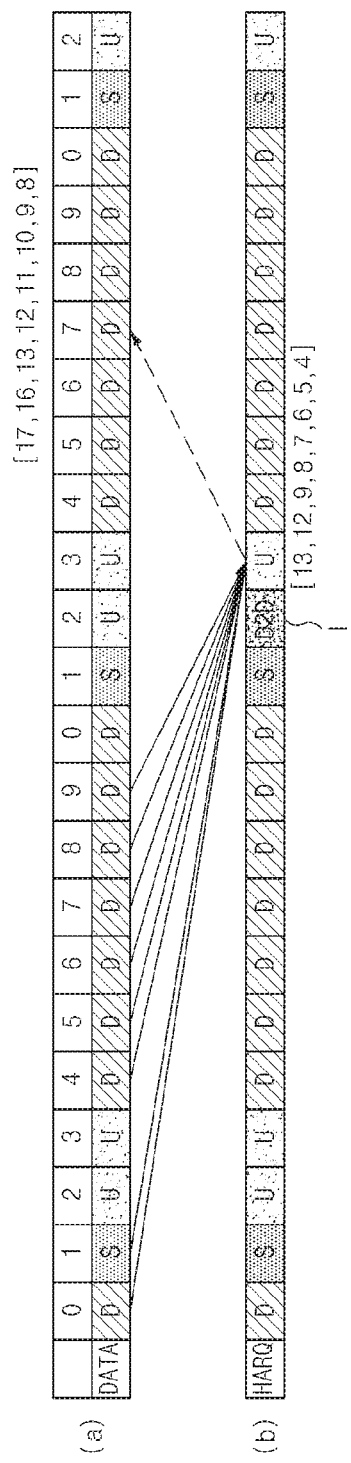
Figure 21:
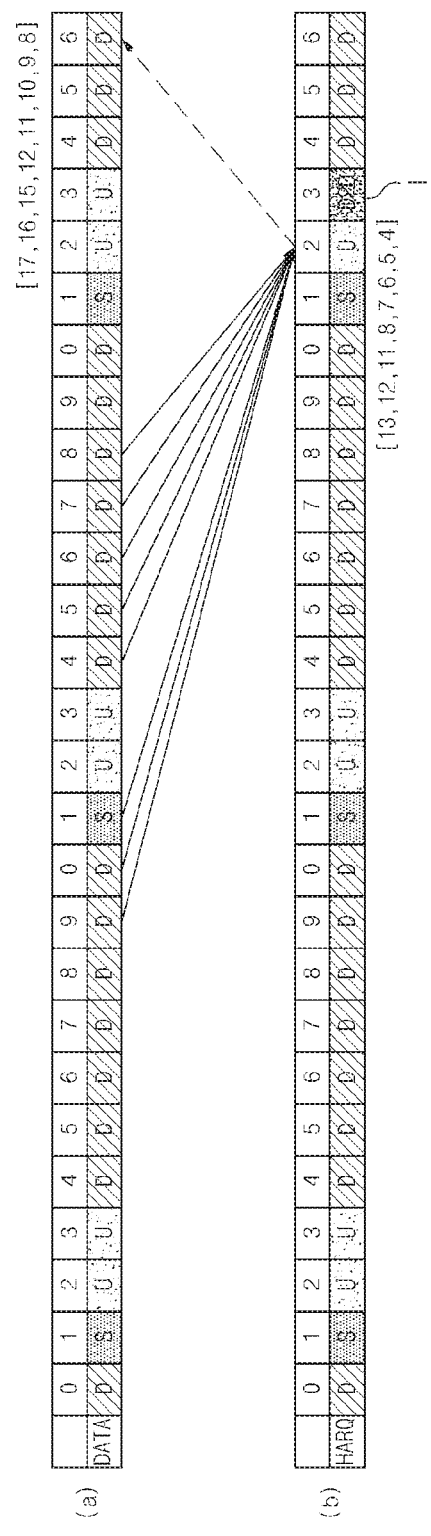
Figure 22:
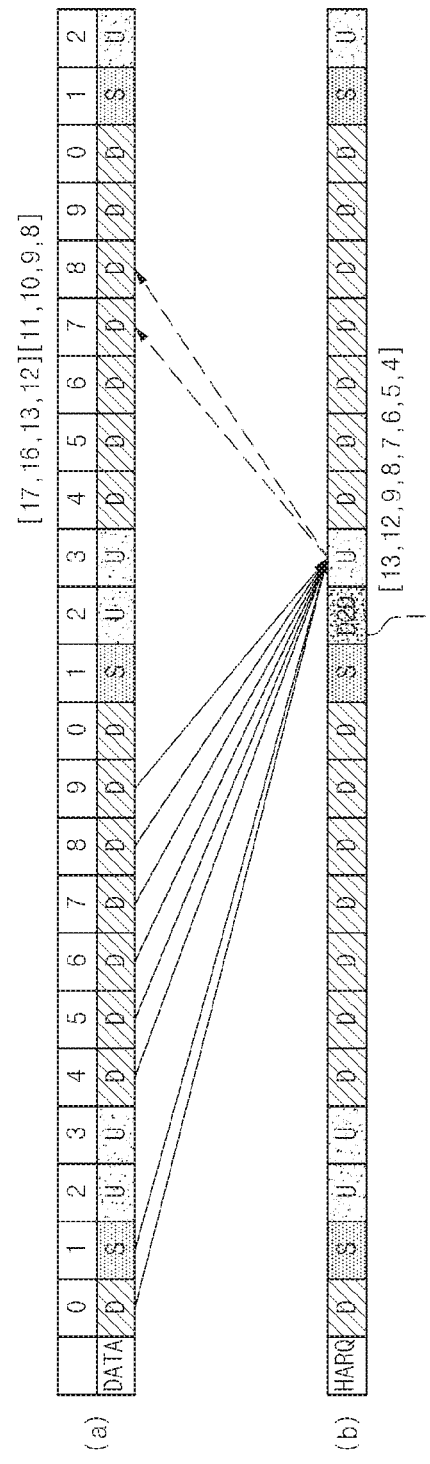

Hereinafter, FIG. 20 to FIG. 22 illustrate a case in which the resource for the device-to-device communication is allocated to the third frame configuration.

Referring to FIG. 20, the data transmission and the HARQ transmission process are shown, when the resource I for the device-to-device communication is allocated to the second sub-frame with respect to the fourth frame configuration. Accordingly, the ACK/NACK (see FIG. 19) transmitted in the second sub-frame with respect to the data reception of the zero-th, first, fourth and fifth sub-frames of the previous frame may be transmitted to the third sub-frame, and a relevant data retransmission may be performed in a seventh sub-frame.

Meanwhile, when a resource for the device-to-device communication is allocated to the second sub-frame, a sub-frame which is able to transmit the ACK/NACK with respect to the data reception of the zero-th sub-frame of the previous frame may become a third sub-frame of the next frame, and a relevant data retransmission may be performed in a seventh sub-frame. This case may be defined as maximum HARQ transmission delay when the resource I for the device-to-device communication is allocated to the second sub-frame with respect to the fourth frame configuration. That is, when the resource for the device-to-device communication is allocated to the second sub-frame with respect to the fourth frame configuration, the maximum HARQ transmission delay may become 17.

Referring to FIG. 21, the data transmission and the HARQ transmission process are shown, when the resource I for the device-to-device communication is allocated to the third sub-frame with respect to the fourth frame configuration. Accordingly, the ACK/NACK (see FIG. 19) transmitted from the third sub-frame with respect to the data reception of the sixth, seventh, eighth, and ninth sub-frames of the previous frame may be transmitted to the second sub-frame, and a relevant data retransmission may be performed in a sixth sub-frame.

Meanwhile, when a resource for the device-to-device communication is allocated to the third sub-frame, a sub-frame which can transmit the ACK/NACK with respect to the data reception of the eighth sub-frame of the previous frame may become a second sub-frame of the next frame, and a relevant data retransmission may be performed in the sixth sub-frame. This case may be defined as maximum HARQ transmission delay when the resource I for the device-to-device communication is allocated to the third sub-frame with respect to the fourth frame configuration. That is, when the resource for the device-to-device communication is allocated to the third sub-frame with respect to the fourth frame configuration, the maximum HARQ transmission delay may become 17.

As illustrated in FIG. 20 and FIG. 21, when the resource for the device-to-device communication is allocated to the second sub-frame or the third sub-frame in the fourth frame configuration, the maximum HARQ transmission delay are the same, i.e., 17.

As described above, when the HARQ transmission delay are the same, the resource allocating unit 120 of the terminal 100 according to an embodiment of the present disclosure may allocate the resource for the device-to-device communication to a sub-frame having the greatest index difference from a special sub-frame. Since the special sub-frame is configured of a downlink pilot time slot, a guard period, and an uplink pilot time slot, when a next sub-frame of the special sub-frame is used as the uplink sub-frame, the uplink resource may be continuously used. Accordingly, the resource allocating unit 120 of the terminal 100 according to an embodiment of the present disclosure may allocate the resource for the device-to-device communication to the third sub-frame with respect to the fourth frame configuration.

In the meantime, in FIG. 20 and FIG. 21, the ACK/NACK for the eight downlink transmission should be transmitted to a single uplink sub-frame due to a limited uplink resource according to resource allocation for the device-to-device communication.

To solve this problem, the resource allocating unit 120 of the terminal 100 according to an embodiment of the present disclosure may limit the resource allocation for the device-to-device communication when the resource allocated to the HARQ and the bit number of the ACK/NACK are limited. For example, when the bit number of the ACK/NACK which can be transmitted in a single uplink sub-frame is four bits, that is, when only the ACK/NACK for the maximum four downlink sub-frames can be transmitted in a single uplink sub-frame, the resource allocating unit 120 of the terminal 100 may not allocate the resource for the device-to-device communication.

Further, in the case of the fifth frame configuration (see FIG. 4), since the fifth frame configuration includes only a single uplink sub-frame (e.g., second sub-frame), the uplink resource is relatively insufficient. Accordingly, when the resource for the device-to-device communication is allocated to the above sub-frame (i.e., the second sub-frame), the HARQ transmission delay may exceed the requirement of the system or may exceed the bit number of the ACK/NACK which can be transmitted to a single uplink frame. Accordingly, when the maximum HARQ transmission delay of the HARQ transmission process according to the communication between the base station and the terminal exceeds the requirements or the limitations of the system, the resource allocating unit 120 of the terminal 100 according to an embodiment of the present disclosure may limit the resource allocation for the device-to-device communication.

Although all resources for the data retransmission are allocated to the seventh sub-frame in FIG. 20, FIG. 22 illustrates a case in which there is a limitation (e.g., a case in which the maximum sub-frame which can be re-transmitted to a single sub-frame is 4) in the allocation of retransmission resource of the system. In this case, the resource allocating unit 120 of the terminal 100 according to an embodiment of the present disclosure may distribute the resource for the data retransmission to a next sub-frame. That is, the resource allocating unit 120 may uniformly distribute the resource allocation for the data transmission between the sub-frames while minimizing the maximum HARQ transmission delay.

FIG. 23 to FIG. 28 are diagrams illustrating a method for allocating a resource of a terminal in a sixth frame configuration according to an embodiment of the present disclosure.

Figure 23:
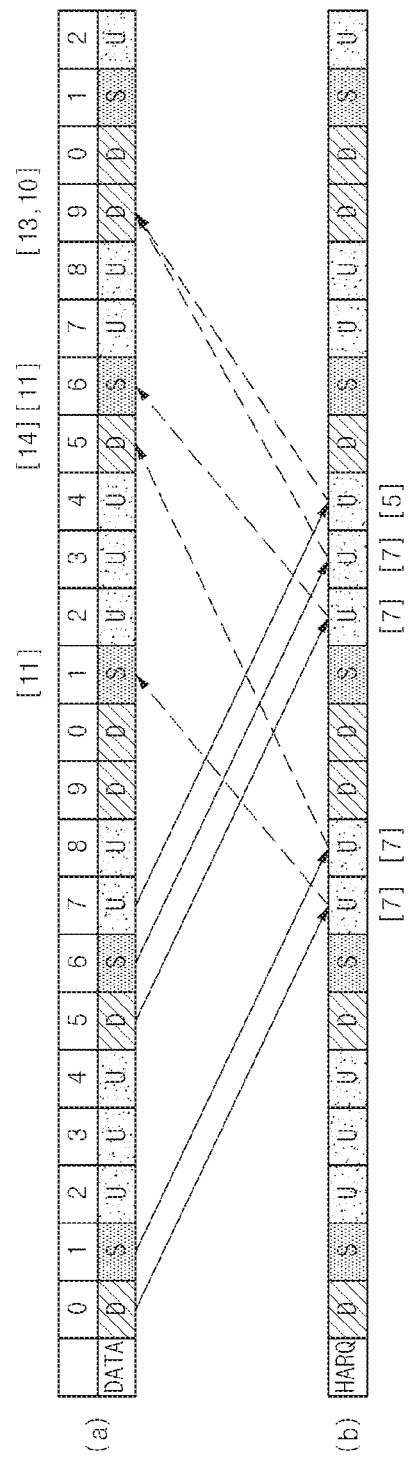
FIG. 23 to FIG. 28 are diagrams illustrating a method for allocating a resource of a terminal in a sixth frame configuration according to an embodiment of the present disclosure.

First, FIG. 23 illustrates the reception of downlink data in the existing sixth TDD frame configuration (see FIG. 4), a relevant ACK/NACK transmission, and the number of the sub-frame up to a first retransmission possible sub-frame. In detail, referring to FIG. 23, FIG. 23A illustrates a reception process of data. FIG. 23B illustrates a transmission process of the ACK/NACK.

Hereinafter, FIG. 24 to FIG. 28 illustrate a case in which the resource for the device-to-device communication is allocated to the sixth frame configuration.

Figure 24:
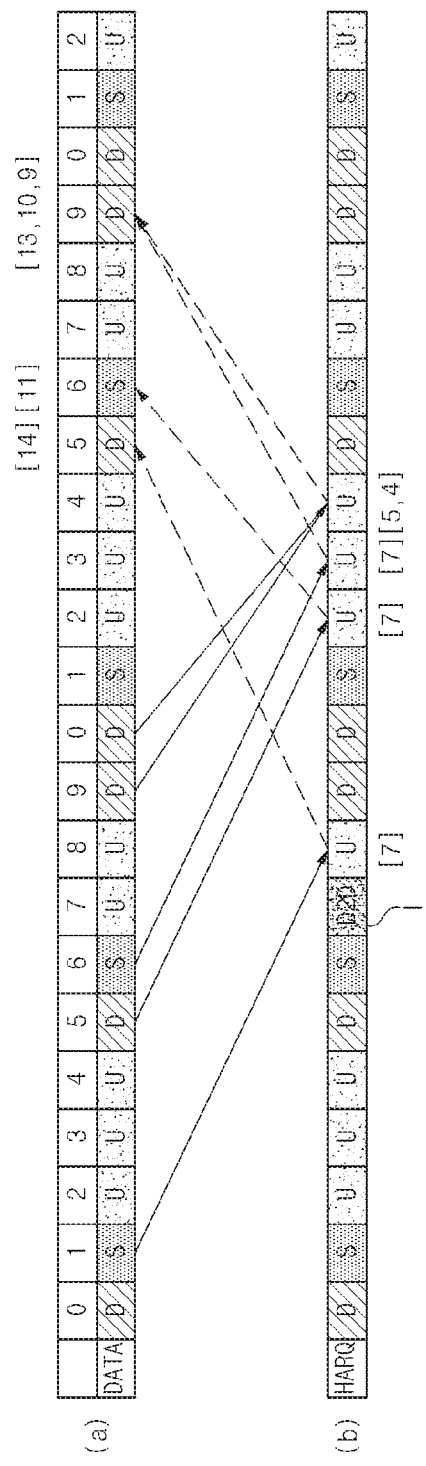

Referring to FIG. 24, the data reception and the HARQ transmission process are shown, when a resource I for the device-to-device communication is allocated to the seventh sub-frame with respect to the sixth frame configuration. Accordingly, the ACK/NACK (see FIG. 23) transmitted in the seventh sub-frame with respect to the data reception of the zero-th sub-frame may be transmitted to a fourth sub-frame, and a relevant data retransmission may be performed in a ninth sub-frame. In the meantime, the ACK/NACK (see FIG. 23) transmitted in the eighth sub-frame with respect to the data reception of the first sub-frame may maintain the existing HARQ transmission process, and the maximum HARQ transmission delay may become 14. That is, when the resource for the device-to-device communication is allocated to the seventh sub-frame with respect to the sixth frame configuration, the maximum HARQ transmission delay may become 14.

Figure 25:
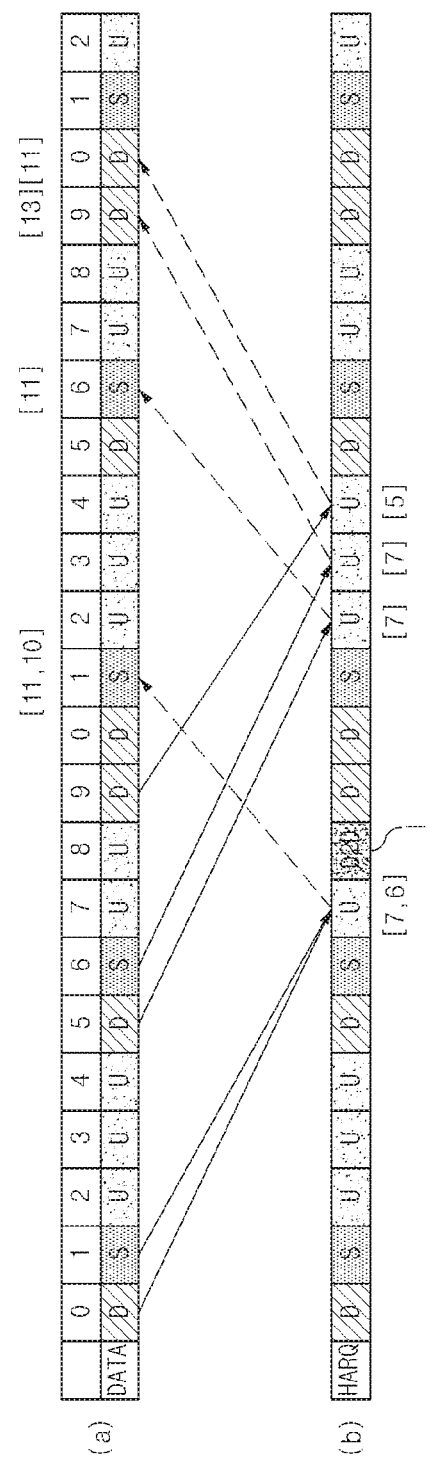

Referring to FIG. 25, the data reception and the HARQ transmission process are shown when a resource I for the device-to-device communication is allocated to the eighth sub-frame with respect to the sixth frame configuration. Accordingly, the ACK/NACK (see FIG. 23) transmitted in the eighth sub-frame with respect to the data reception of the first sub-frame may be transmitted to a seventh sub-frame, and a relevant data retransmission may be performed in a first sub-frame of the next frame. In the meantime, the ACK/NACK (see FIG. 23) transmitted in the third sub-frame of the next frame with respect to the data reception of the sixth sub-frame may maintain the existing HARQ transmission process, and the maximum HARQ transmission delay may become 13. That is, when the resource for the device-to-device communication is allocated to the eighth sub-frame with respect to the sixth frame configuration, the maximum HARQ transmission delay may become 13.

Figure 26:
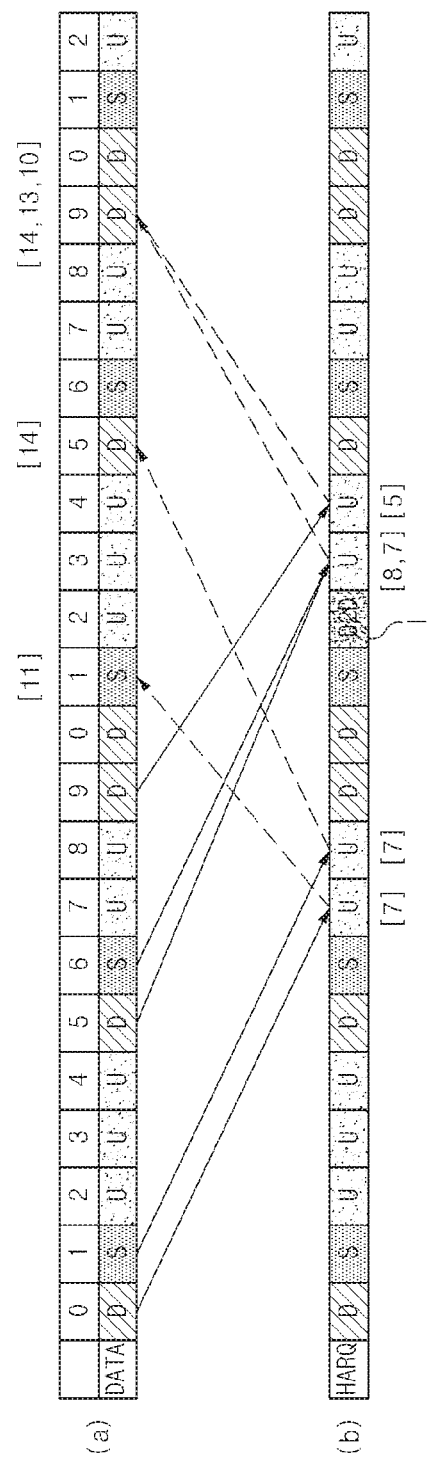

Referring to FIG. 26, the data reception and the HARQ transmission process are shown when a resource I for the device-to-device communication is allocated to the second sub-frame with respect to the sixth frame configuration. Accordingly, the ACK/NACK (see FIG. 23) transmitted in the second sub-frame with respect to the data reception of the fifth sub-frame may be transmitted to a third sub-frame, and a relevant data retransmission may be performed in the ninth sub-frame. Meanwhile, the ACK/NACK (see FIG. 23) transmitted in the seventh sub-frame with respect to the data reception of the first sub-frame may maintain the existing HARQ transmission process, and the maximum HARQ transmission delay may become 14. That is, when the resource for the device-to-device communication is allocated to the second sub-frame with respect to the sixth frame configuration, the maximum HARQ transmission delay may become 14.

Figure 27:
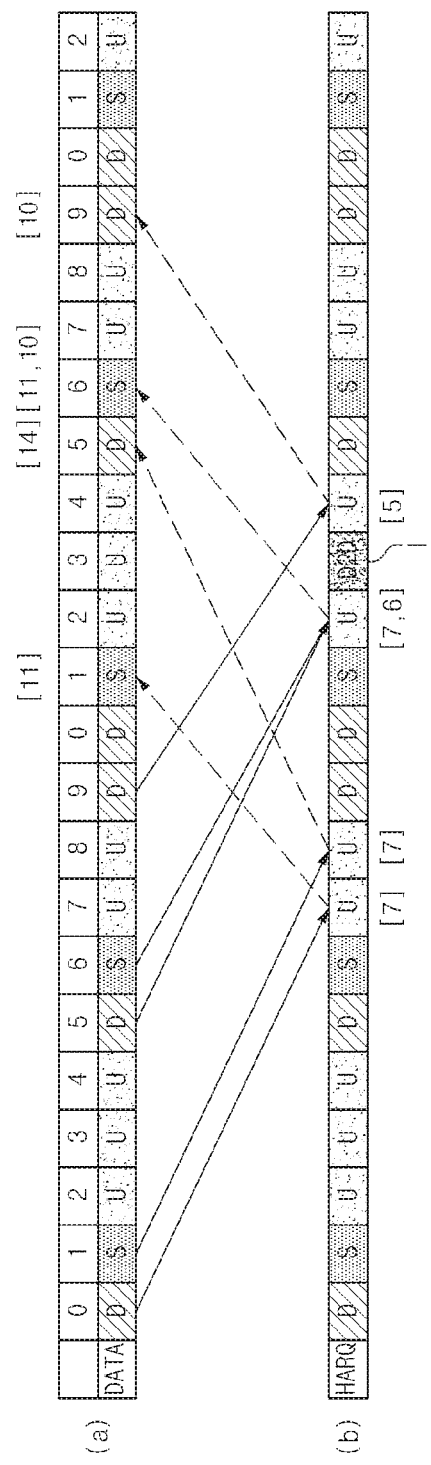

Referring to FIG. 27, the data reception and the HARQ transmission process are shown when a resource I for the device-to-device communication is allocated to the third sub-frame with respect to the sixth frame configuration. Accordingly, the ACK/NACK (see FIG. 23) transmitted in the third sub-frame with respect to the data reception of the sixth sub-frame may be transmitted to a second sub-frame, and a relevant data retransmission may be performed in the sixth sub-frame. Meanwhile, the ACK/NACK (see FIG. 23) transmitted in the seventh sub-frame with respect to the data reception of the first sub-frame may maintain the existing HARQ transmission process, and the maximum HARQ transmission delay may become 14. That is, when the resource for the device-to-device communication is allocated to the third sub-frame with respect to the sixth frame configuration, the maximum HARQ transmission delay may become 14.

Figure 28:
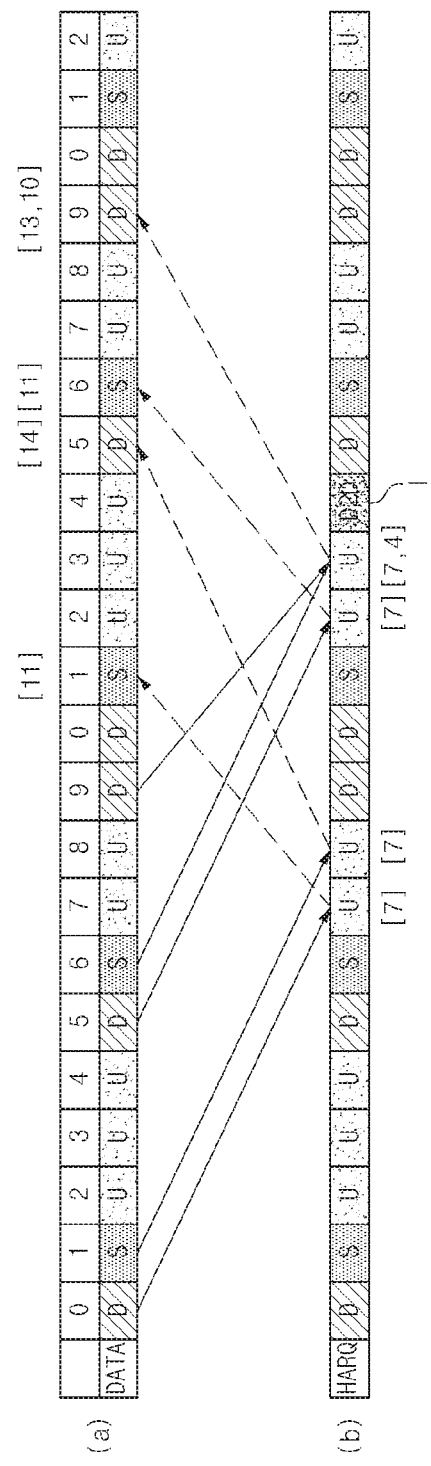

Referring to FIG. 28, the data reception and the HARQ transmission process are shown when a resource I for the device-to-device communication is allocated to the fourth sub-frame with respect to the sixth frame configuration. Accordingly, the ACK/NACK (see FIG. 23) transmitted in the fourth sub-frame with respect to the data reception of the ninth sub-frame may be transmitted to a third sub-frame, and a relevant data retransmission may be performed in the ninth sub-frame. Meanwhile, the ACK/NACK (see FIG. 23) transmitted in the seventh sub-frame with respect to the data reception of the first sub-frame may maintain the existing HARQ transmission process, and the maximum HARQ transmission delay may become 14. That is, when the resource for the device-to-device communication is allocated to the fourth sub-frame with respect to the sixth frame configuration, the maximum transmission delay may become 14.

As a result, as shown in FIG. 23 to FIG. 28, the resource allocating unit 120 of the terminal 100 may allocate the resource for the device-to-device communication to the eighth sub-frame so that the maximum HARQ transmission delay among HARQ transmissions performed in a frame configuration with respect to the sixth frame configuration may be minimized.

FIG. 29 is a diagram illustrating a frame configuration reflecting a method for allocating a resource of a terminal according to an embodiment of the present disclosure.

In detail, FIG. 29 illustrates a frame configuration reflecting the method for allocating a resource for the device-to-device communication by the resource allocating unit 120 of the terminal 100 described with reference to FIG. 8 to FIG. 29.

Referring to FIG. 29, in the case of zero-th to second frame configurations, since the zero-th to fourth sub-frames have the same structure as that of the fifth to ninth sub-frames, the zero-th to second frame configurations may have the same resource allocation. For example, In the case of the zero-th frame configuration, the resource for the device-to-device communication may be allocated to the third and eighth sub-frames. However, when it is not necessary to allocate the resource for the device-to-device communication according to a configuration of a system, all of the third and eighth sub-frames may be used for a general uplink frame, the resource for the device-to-device communication may be allocated to only one of the third or eighth sub-frame, or the resource for the device-to-device communication may be allocated to the third and eighth sub-frames. The first frame configuration and the second frame configuration are also identically applied.

Meanwhile, in a case in which the resource for the device-to-device communication is allocated to the second and seventh sub-frames in the second frame configuration or the resource for the device-to-device communication is allocated to the second sub-frame in the fifth frame configuration, when a problem occurs, for example, the bit number of the ACK/NACK and the requirement for HARQ transmission delay cannot be satisfied, the resource allocation for the device-to-device communication may be limited.

FIG. 30 is a diagram illustrating resource allocation for HARQ transmission according to a frame configuration reflecting a method for allocating a resource of a terminal according to an embodiment of the present disclosure.

Referring to FIG. 30, in the case of zero-th frame configuration, since the resource for the device-to-device communication is allocated to the third sub-frame to which the ACK/NACK is not transmitted, there is no change according to the resource allocation for the device-to-device communication (see FIG. 4). In the case of first, third, fourth, and sixth frame configurations, the ACK/NACK transmission timing according to the resource allocation for the device-to-device communication is changed to X-D2D (X depends on the number of a frame configuration). In the case of the second frame configuration, when the resource for the device-to-device communication is allocated to the second sub-frame, the seventh sub-frame may transmit the ACK/NACK of a sub-frame prior to the thirteenth, twelfth, eleventh, ninth, eighth, seventh, fourth, and sixth sub-frames. To the contrary, when the resource for the device-to-device communication is allocated to the seventh sub-frame, the above ACK/NACK transmission may be accomplished in the second sub-frame.

FIG. 31 to FIG. 37 are diagrams illustrating a method for allocating a resource of a terminal in a burst mode according to an embodiment of the present disclosure.

In detail, FIG. 31 to FIG. 37 illustrate a method for allocating a resource of the terminal 100 when the resource allocation for the device-to-device communication is continuously required (i.e., in the case in which allocation of the burst resource is required).

In the case of the zero-th frame configuration, the resource for the device-to-device communication may be continuously allocated to the second and third sub-frames (or seventh and eighth sub-frames) or the third and fourth sub-frames (or eighth and ninth sub-frames).

Figure 31:
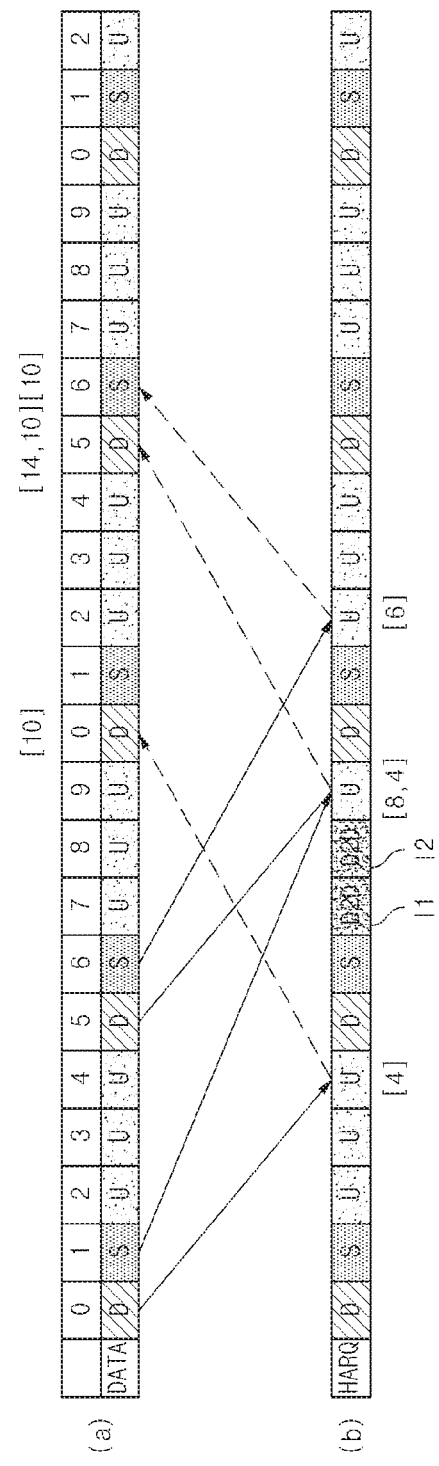
FIG. 31 to FIG. 37 are diagrams illustrating a method for allocating a resource of a terminal in a burst mode according to an embodiment of the present disclosure.

Referring to FIG. 31, the data reception and the HARQ transmission process are shown when resources I1 and I2 for the device-to-device communication are allocated to the seventh and eighth sub-frames with respect to the zero-th frame configuration. Accordingly, the ACK/NACK (see FIG. 8) transmitted in the seventh sub-frame with respect to the data reception of the first sub-frame may be transmitted to a ninth sub-frame, and a relevant data retransmission may be performed in the fifth sub-frame of the next frame. That is, when the resource for the device-to-device communication is continuously allocated to the seventh and eighth sub-frames with respect to the zero-th frame configuration, the maximum HARQ transmission delay may become 14.

Figure 32:
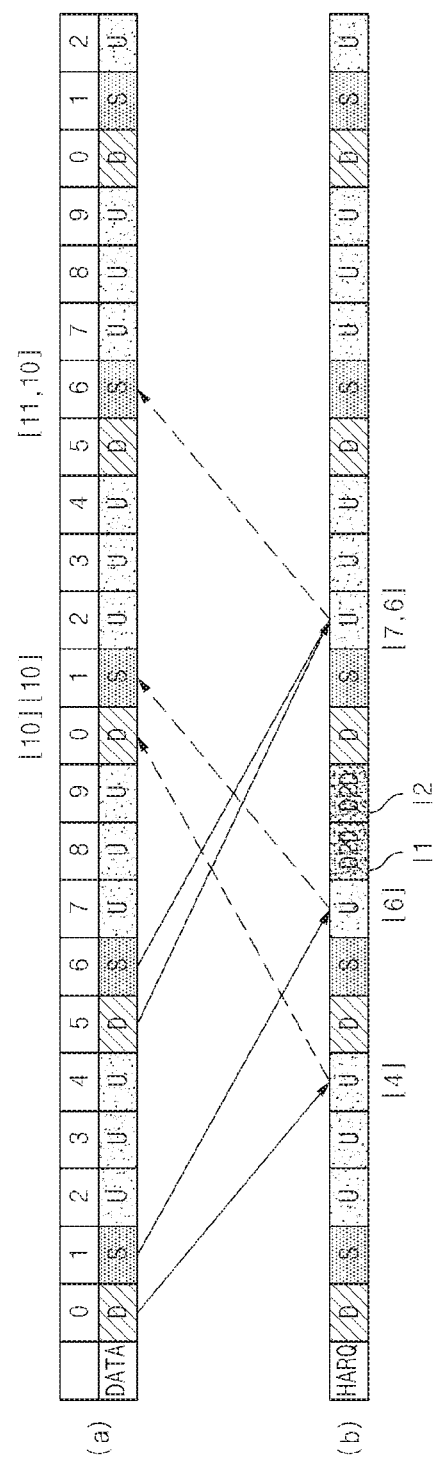

Referring to FIG. 32, the data reception and the HARQ transmission process are shown, when the resources I1 and I2 for the device-to-device communication are allocated to the eighth and ninth sub-frames with respect to the zero-th frame configuration. Accordingly, the ACK/NACK (see FIG. 8) transmitted in the ninth sub-frame with respect to the data reception of the fifth sub-frame may be transmitted to a second sub-frame of the next frame, and a relevant data retransmission may be performed in the sixth sub-frame of the next frame. That is, when the resource for the device-to-device communication is continuously allocated to the eighth and ninth sub-frames with respect to the zero-th frame configuration, the maximum HARQ transmission delay may become 11.

As a result, as shown in FIG. 31 and FIG. 32, the resource allocating unit 120 of the terminal 100 may continuously allocate the resource for the device-to-device communication to the eighth and ninth sub-frames (or the third and fourth sub-frames) so that the maximum HARQ transmission delay among HARQ transmissions performed in a frame configuration with respect to the zero-th frame configuration may be minimized.

In the case of the third frame configuration, the resource for the device-to-device communication may be continuously allocated to the second and third sub-frames or the third and fourth sub-frames.

Figure 33:
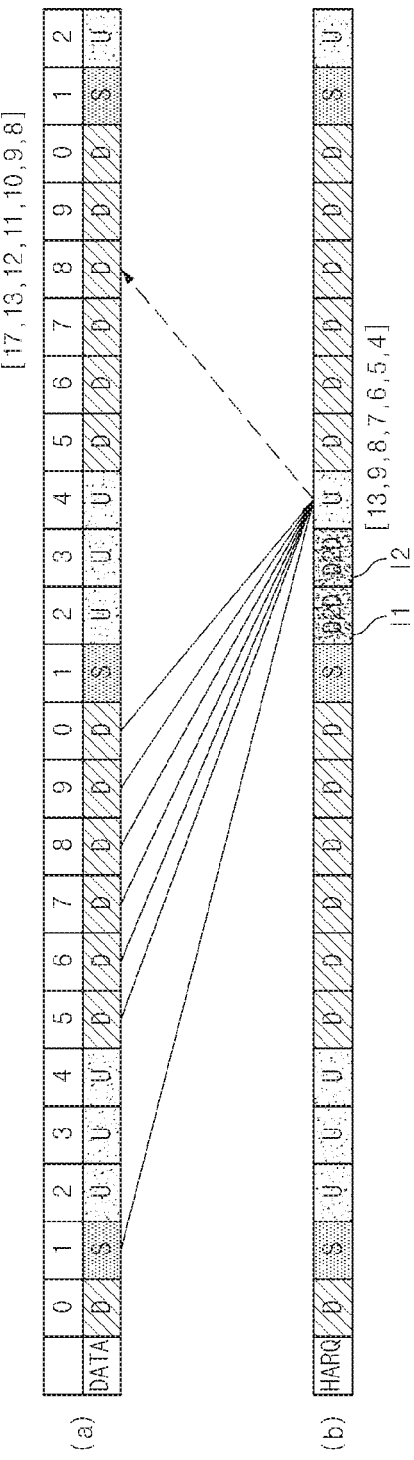

Referring to FIG. 33, the data reception and the HARQ transmission process are shown, when resources I1 and I2 for the device-to-device communication are allocated to the second and third sub-frames with respect to the third frame configuration. Accordingly, the ACK/NACK (see FIG. 15) transmitted in the second and third sub-frames with respect to the data reception of the first, fifth to eighth sub-frames may be transmitted to fourth sub-frame, and a relevant data retransmission may be performed in the eighth sub-frame of the next frame. That is, when the resource for the device-to-device communication is continuously allocated to the second and third sub-frames with respect to the third frame configuration, the maximum HARQ transmission delay may become 17.

Figure 34:
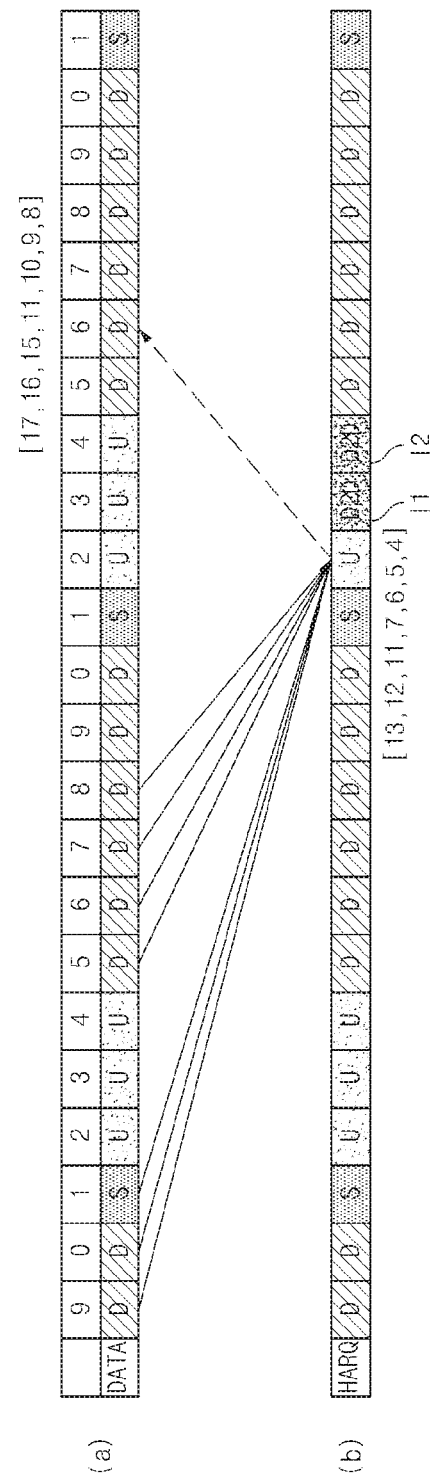

Referring to FIG. 34, the data reception and the HARQ transmission process are shown, when the resources I1 and I2 for the device-to-device communication are allocated to the third and fourth sub-frames with respect to the third frame configuration. Accordingly, the ACK/NACK (see FIG. 15) transmitted in the third and fourth sub-frames with respect to the data reception of the seventh to ninth, and zero-th sub-frames may be transmitted to a second sub-frame, and a relevant data retransmission may be performed in the sixth sub-frame of the next frame. That is, when the resource for the device-to-device communication is continuously allocated to the third and fourth sub-frames with respect to the third frame configuration, the maximum HARQ transmission delay may become 17.

As shown in FIG. 33 and FIG. 34, when the HARQ transmission delay is identical with each other, as illustrated in FIG. 20 and FIG. 21, the resource allocating unit 120 of the terminal 100 according to an embodiment of the present disclosure may continuously allocate the resource for the device-to-device communication to the third and fourth sub-frames having the greatest index difference from a special sub-frame by considering an interval from the special sub-frame.

In the case of the sixth frame configuration, the resource for the device-to-device communication may be continuously allocated to the second and third sub-frames, or the third and fourth sub-frames, or the seventh and eight sub-frames.

Figure 35:
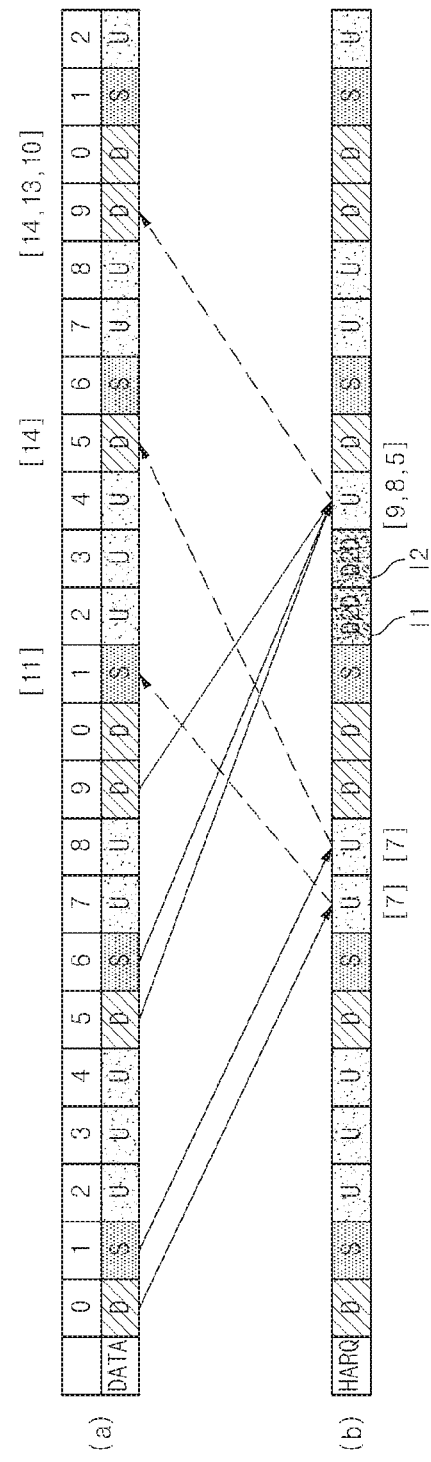

Referring to FIG. 35, the data reception and the HARQ transmission process are shown, when the resources I1 and I2 for the device-to-device communication are allocated to the second and third sub-frames with respect to the sixth frame configuration. Accordingly, the ACK/NACK (see FIG. 23) transmitted in the second and third sub-frames with respect to the data reception of the fifth and sixth sub-frames may be transmitted to a fourth sub-frame, and a relevant data retransmission may be performed in the ninth sub-frame of the next frame. That is, when the resource for the device-to-device communication is continuously allocated to the second and third sub-frames with respect to the sixth frame configuration, the maximum HARQ transmission delay may become 14.

Figure 36:
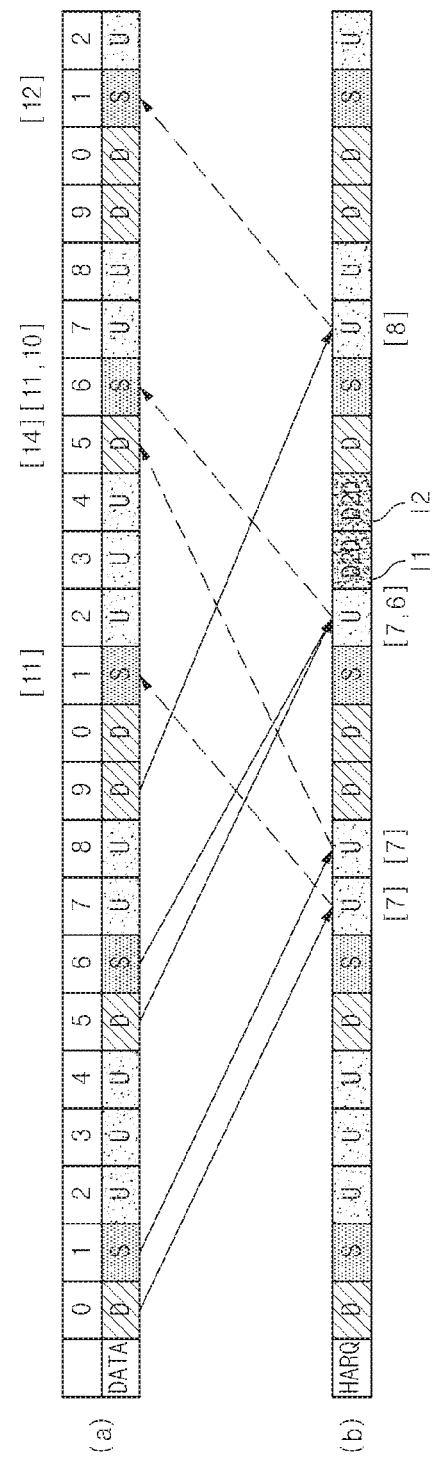

Referring to FIG. 36, the data reception and the HARQ transmission process are shown, when the resources I1 and I2 for the device-to-device communication are allocated to the third and fourth sub-frames with respect to the sixth frame configuration. Accordingly, the ACK/NACK (see FIG. 23) transmitted in the third and fourth sub-frames with respect to the data reception of the sixth and ninth sub-frames may be transmitted to the second and seventh sub-frames. Meanwhile, the ACK/NACK (see FIG. 23) transmitted in the seventh sub-frame with respect to the data reception of the first sub-frame may maintain the existing HARQ transmission process, and the maximum HARQ transmission delay may become 14. That is, when the resource for the device-to-device communication is allocated to the third and fourth sub-frames with respect to the sixth frame configuration, the maximum HARQ transmission delay may become 14.

Figure 37:
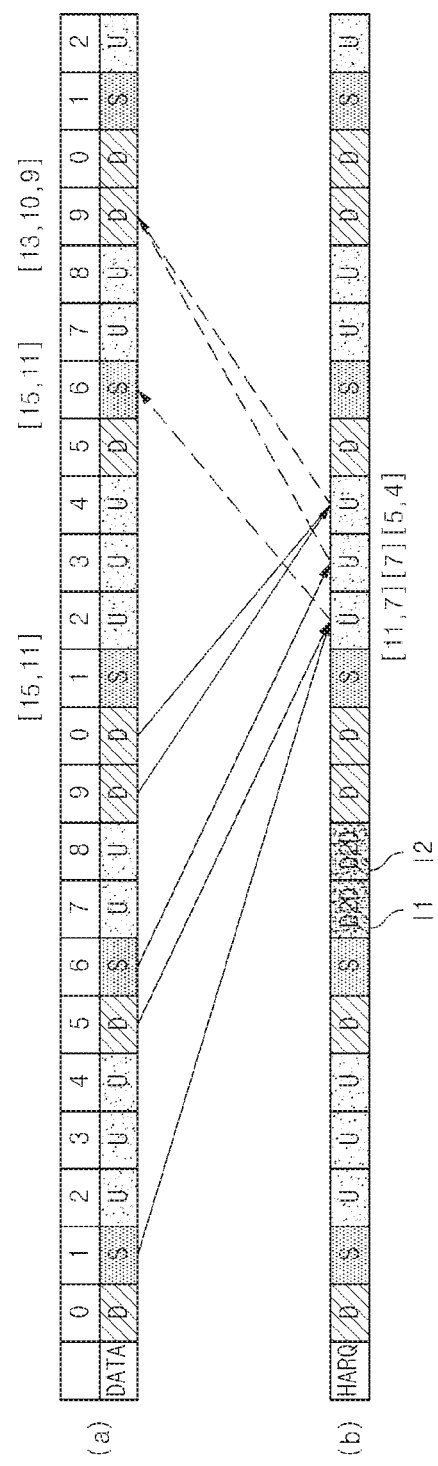

Referring to FIG. 37, the data reception and the HARQ transmission process are shown, when the resources I1 and I2 for the device-to-device communication are allocated to the seventh and eighth sub-frames with respect to the sixth frame configuration. Accordingly, the ACK/NACK (see FIG. 23) transmitted in the seventh and eighth sub-frames with respect to the data reception of the zero-th and first sub-frames may be transmitted to the second and fourth sub-frames, and the data retransmission for the data reception of the first sub-frame may be retransmitted to the sixth sub-frame of the next frame. That is, when the resource for the device-to-device communication is continuously allocated to the seventh and eighth sub-frames with respect to the sixth frame configuration, the maximum HARQ transmission delay may become 15.

As shown in FIG. 35 and FIG. 36, when the maximum HARQ transmission delay is the same, as illustrated in FIG. 20 and FIG. 21, the resource allocating unit 120 of the terminal 100 according to an embodiment of the present disclosure may continuously allocate the resource for the device-to-device communication to the third and fourth sub-frames having the greatest index difference from a special sub-frame by considering an interval from the special sub-frame.

FIG. 38 is a diagram illustrating a frame configuration reflecting a method for allocating a resource of a terminal in a burst mode according to an embodiment of the present disclosure.

Referring to FIG. 38, in the case of zero-th and first frame configurations, since the zero-th to fourth sub-frames have the same structure as that of the fifth to ninth sub-frames, the zero-th and first frame configurations may have the same resource allocation. In addition, in a case in which the resource for the device-to-device communication is continuously allocated to both of the second and third sub-frames and both of the seventh and eighth sub-frames in the first frame configuration, or the resource for the device-to-device communication is continuously allocated to both of the second and third sub-frames in the fourth frame configuration, when a problem occurs, for example, the bit number of the ACK/NACK and the requirement for HARQ transmission delay cannot be satisfied, the resource allocation for the device-to-device communication may be limited.

FIG. 39 is a diagram illustrating resource allocation for HARQ transmission according to a frame configuration reflecting a method for allocating a resource of a terminal in a burst mode according to an embodiment of the present disclosure.

Referring to FIG. 39, in the case of zero-th, first, third, and sixth frame configurations, the ACK/NACK transmission timing according to resource allocation for the device-to-device communication may be changed to X-D2D (X depends on the number of a frame configuration). In the case of the first frame configuration, when the resource for the device-to-device communication is continuously allocated to the second and third sub-frames, the seventh and eighth sub-frames may transmit the ACK/NACK to the sub-frames prior to twelfth, eleventh, and eighth sub-frames and the sub-frames prior to eighth, seventh, and fourth sub-frames. To the contrary, when the resource for the device-to-device communication is continuously allocated to the seventh and eighth sub-frames, the above mentioned ACK/NACK transmission may be achieved in the second and third sub-frames.

FIG. 40 is a diagram illustrating resource allocation for HARQ transmission according to a frame configuration in a carrier aggregation system.

Referring to FIG. 40, the terminal and the method for allocating a resource according to an embodiment of the present disclosure may be applicable to the carrier aggregation system. Carrier aggregation signifies a communication method in which a base station communicates with a terminal using a plurality of carriers. In a procedure of aggregating a plurality of carriers, a carrier for firstly connecting the terminal to the base station refers to a primary carrier (cell), and other carrier refers to a secondary carrier (cell).

Meanwhile, when cross scheduling between cells is applied to the carrier aggregation, the ACK/NACK for the data received from the secondary cell may be transmitted in the primary cell. For example, when the TDD carrier and an FDD carrier are aggregated, the FDD carrier may include a downlink sub-frame and an uplink sub-frame, whereas the TDD carrier may include an uplink sub-frame or a downlink sub-frame and an additional special sub-frame according to time as shown in FIG. 2.

Accordingly, when the TDD carrier may become the primary cell, in order to transmit the ACK/NACK with respect to the data of the FDD carrier, there may be an additional need for the HARQ transmission process as shown in FIG. 40. A value indicated in a square bracket [ ] of FIG. 40 represents the additional HARQ transmission process according to a carrier aggregation. The above embodiments of the present disclosure may be applicable to the carrier aggregation system as shown in FIG. 40.

FIG. 41 is a diagram illustrating resource allocation for HARQ transmission according to a frame configuration reflecting a method for allocating a resource of a terminal in a carrier aggregation system according to an embodiment of the present disclosure.

In detail, FIG. 41 illustrates an additional HARQ transmission process when a resource for the device-to-device communication is allocated to the carrier aggregation system of FIG. 40 using the embodiments of the present disclosure described in the above embodiments of FIG. 8 to FIG. 28.

Referring to FIG. 41, it may be recognized that the same sub-frame illustrated in FIG. 29 and FIG. 30 is allocated as the resource for the device-to-device communication in the additional HARQ transmission process according to the carrier aggregation. This may mean that the above mentioned embodiments of the present disclosure may be sufficiently applicable to the carrier aggregation system.

As described above, for ease of illustration, the embodiments of the present disclosure was illustrated based on the downlink data transmission, the uplink ACK/NACK transmission, and the downlink data retransmission process. However, the present disclosure is not limited thereto, and is also applicable to the uplink data transmission, the downlink ACK/NACK transmission, and the uplink data retransmission process.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for allocating a resource of a terminal, the method comprising:
   receiving downlink data through a downlink sub-frame according to a frame configuration from a base station; and
   allocating a resource for a device-to-device communication to at least one uplink sub-frame according to the frame configuration by considering a hybrid ARQ (HARQ) transmission delay with respect to the received downlink data,
   wherein the HARQ transmission delay is defined by a time or a number of sub-frames to an initial sub-frame that can be retransmitted, after transmitting ACK/NACK with regard to the downlink data reception, and
   wherein the resource for the device-to-device communication is allocated to uplink sub-frames#3 and 8 when the frame configuration is 0 or 1, the resource for the device-to-device communication is allocated to uplink sub-frames#2 and 7 when the frame configuration is 2, the resource for the device-to-device communication is allocated to an uplink sub-frame#3 when the frame configuration is 3 or 4, the resource for the device-to-device communication is allocated to the uplink sub-frame#2 when the frame configuration is 5, or the resource for the device-to-device communication is allocated to the uplink sub-frame#8 when the frame configuration is 6.

2. The method of claim 1, further comprising allocating a resource for the HARQ transmission to a sub-frame by considering the at least one sub-frame to which the device-to-device communication is allocated.

3. The method of claim 2, wherein allocating the resource for the HARQ transmission to a sub-frame by considering the at least one sub-frame to which the device-to-device communication is allocated comprises allocating the resource for the HARQ transmission to a next sub-frame or a previous sub-frame of the at least one sub-frame to which the resource for the device-to-device communication is allocated.

4. The method of claim 3, wherein allocating the resource for the HARQ transmission to a sub-frame by considering the at least one sub-frame to which the device-to-device communication is allocated comprises allocating the resource for the HARQ transmission to a sub-frame different from the next sub-frame or the previous sub-frame.

5. The method of claim 1, wherein the HARQ transmission is performed in a carrier aggregation system.

6. A method for allocating a resource of a terminal, the method comprising:
   receiving downlink data from a base station; and
   allocating a resource for a device-to-device communication to a sub-frame by considering a hybrid ARQ (HARQ) transmission delay with respect to the received downlink data,
   wherein allocating a resource for a device-to-device communication to a sub-frame comprises allocating the resource for the device-to-device communication to an uplink sub-frame, and
   wherein allocating a resource for a device-to-device communication to a sub-frame comprises allocating the resource for the device-to-device communication to a sub-frame having a greatest index difference from a special sub-frame when a maximum HARQ transmission delay of HARQ transmissions performed under the same frame configuration is identical with each other regardless of an index of a sub-frame to which the resource for the device-to-device communication is allocated.

7. A method for allocating a resource of a terminal, the method comprising:
   receiving downlink data through a downlink sub-frame according to a frame configuration from a base station; and
   allocating a resource for a device-to-device communication to at least one uplink sub-frame according to the frame configuration by considering a hybrid ARQ (HARQ) transmission delay with respect to the received downlink data,
   wherein the HARQ transmission delay is defined by a time or a number of sub-frames to an initial sub-frame that can be retransmitted, after transmitting ACK/NACK with regard to the downlink data reception, and
   wherein the resource for the device-to-device communication is allocated to uplink sub-frames#3-4 and 8-9 when the frame configuration is 0, the resource for the device-to-device communication is allocated to uplink sub-frames#2-3 and 7-8 when the frame configuration is 1, the resource for the device-to-device communication is allocated to uplink sub-frames#3-4 when the frame configuration is 3, the resource for the device-to-device communication is allocated to uplink sub-frames#2-3 when the frame configuration is 4, or the resource for the device-to-device communication is allocated to uplink sub-frames#3-4 when the frame configuration is 6.

\* \* \* \* \*